United States Patent
Lee et al.

(10) Patent No.: US 11,871,113 B2
(45) Date of Patent: Jan. 9, 2024

(54) COIL MEMBER FOR CORRECTING HAND-SHAKE AND CAMERA MODULE HAVING THE SAME

(71) Applicant: LG INNOTEK CO., LTD., Seoul (KR)

(72) Inventors: Seung Jin Lee, Seoul (KR); Hyung Kyu Yoon, Seoul (KR); Hye Yeong Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 161 days.

(21) Appl. No.: 17/767,088

(22) PCT Filed: Oct. 8, 2020

(86) PCT No.: PCT/KR2020/013703
§ 371 (c)(1),
(2) Date: Apr. 7, 2022

(87) PCT Pub. No.: WO2021/075789
PCT Pub. Date: Apr. 22, 2021

(65) Prior Publication Data
US 2022/0368832 A1 Nov. 17, 2022

(30) Foreign Application Priority Data

Oct. 16, 2019 (KR) .......................... 10-2019-0128657
Oct. 16, 2019 (KR) .......................... 10-2019-0128666

(51) Int. Cl.
*H04N 23/68* (2023.01)
*G03B 5/00* (2021.01)
*H01F 27/29* (2006.01)

(52) U.S. Cl.
CPC ............. *H04N 23/687* (2023.01); *G03B 5/00* (2013.01); *H01F 27/29* (2013.01); *G03B 2205/0007* (2013.01)

(58) Field of Classification Search
CPC ...... H04N 23/687; H04N 23/57; H04N 23/00; H04N 23/55; H04N 23/54; G03B 5/00;
(Continued)

(56) References Cited

U.S. PATENT DOCUMENTS 9,865,388 B2 * 1/2018 Ishida ................. H01F 27/2804
9,976,224 B2 5/2018 Jeong et al.
(Continued)

FOREIGN PATENT DOCUMENTS

CN 104733154 6/2015
KR 10-2016-0122955 10/2016
(Continued)

OTHER PUBLICATIONS

Chinese Office Action dated Apr. 15, 2023 issued in Application No. 202080072450.5.
(Continued)

*Primary Examiner* — Chiawei Chen
(74) *Attorney, Agent, or Firm* — KED & ASSOCIATES, LLP

(57) ABSTRACT

A coil member according to an embodiment comprises: a substrate having a top surface and a bottom surface opposite the top surface; a first coil electrode disposed on the top surface of the substrate and including a first pattern electrode; and a second coil electrode disposed on the bottom surface of the substrate and including a second pattern electrode. The first coil electrode includes: a first outermost pattern electrode; a first innermost pattern electrode; and a central pattern electrode between the first outermost pattern electrode and the first innermost pattern electrode, wherein the line width of at least one of the first outermost pattern electrode or the first innermost pattern electrode is greater than the line width of the central pattern electrode.

20 Claims, 13 Drawing Sheets

(58) Field of Classification Search
CPC .... G03B 2205/0007; G03B 2205/0023; G03B 2205/0069; G03B 5/06; H01F 27/29
See application file for complete search history.

(56) References Cited

U.S. PATENT DOCUMENTS

| | | | |
|---|---|---|---|
| 10,673,131 | B2 | 6/2020 | Ahn et al. |
| 10,768,437 | B2 | 9/2020 | Park et al. |
| 10,923,266 | B2* | 2/2021 | Ryu ................ H01F 17/04 |
| 11,083,092 | B2 | 8/2021 | Ueda et al. |
| 11,348,722 | B2* | 5/2022 | Kim ................ H01F 27/292 |
| 2013/0057757 | A1 | 3/2013 | Ryou |
| 2015/0170823 | A1* | 6/2015 | Jeong ................ C25D 7/001 |
| | | | 336/200 |
| 2016/0216476 | A1 | 7/2016 | Lee |
| 2017/0330674 | A1 | 11/2017 | Lee et al. |
| 2018/0054900 | A1 | 2/2018 | Ueda et al. |
| 2019/0221356 | A1 | 7/2019 | Bong et al. |
| 2019/0279807 | A1* | 9/2019 | Ryu ................ H01F 41/041 |
| 2021/0329795 | A1 | 10/2021 | Ueda et al. |

FOREIGN PATENT DOCUMENTS

| | | |
|---|---|---|
| KR | 10-2017-0082805 | 7/2017 |
| KR | 10-2018-0071443 | 6/2018 |
| KR | 10-2018-0071644 | 6/2018 |
| KR | 10-2019-0040642 | 4/2019 |
| WO | WO 2016/147993 | 9/2016 |

OTHER PUBLICATIONS

International Search Report dated Jan. 12, 2021 issued in Application No. PCT/KR2020/013703.

* cited by examiner

[FIG. 1]
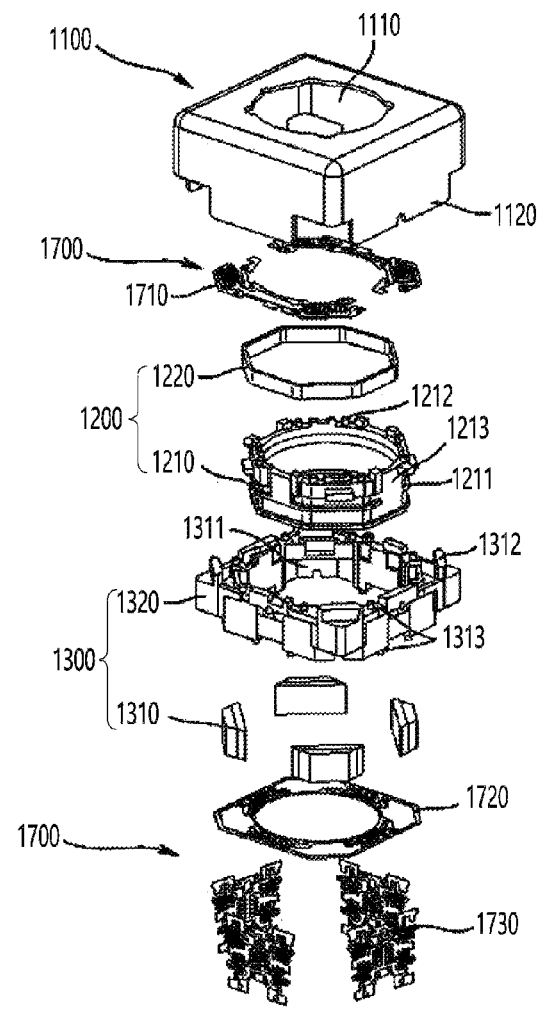
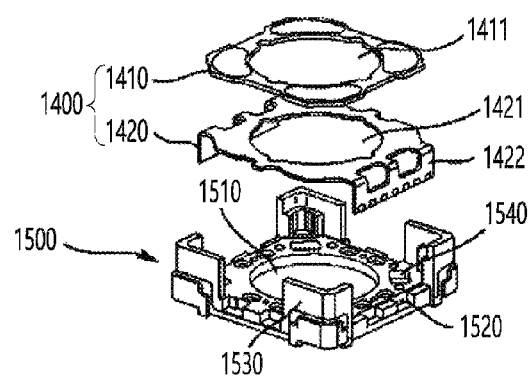

[FIG. 2]
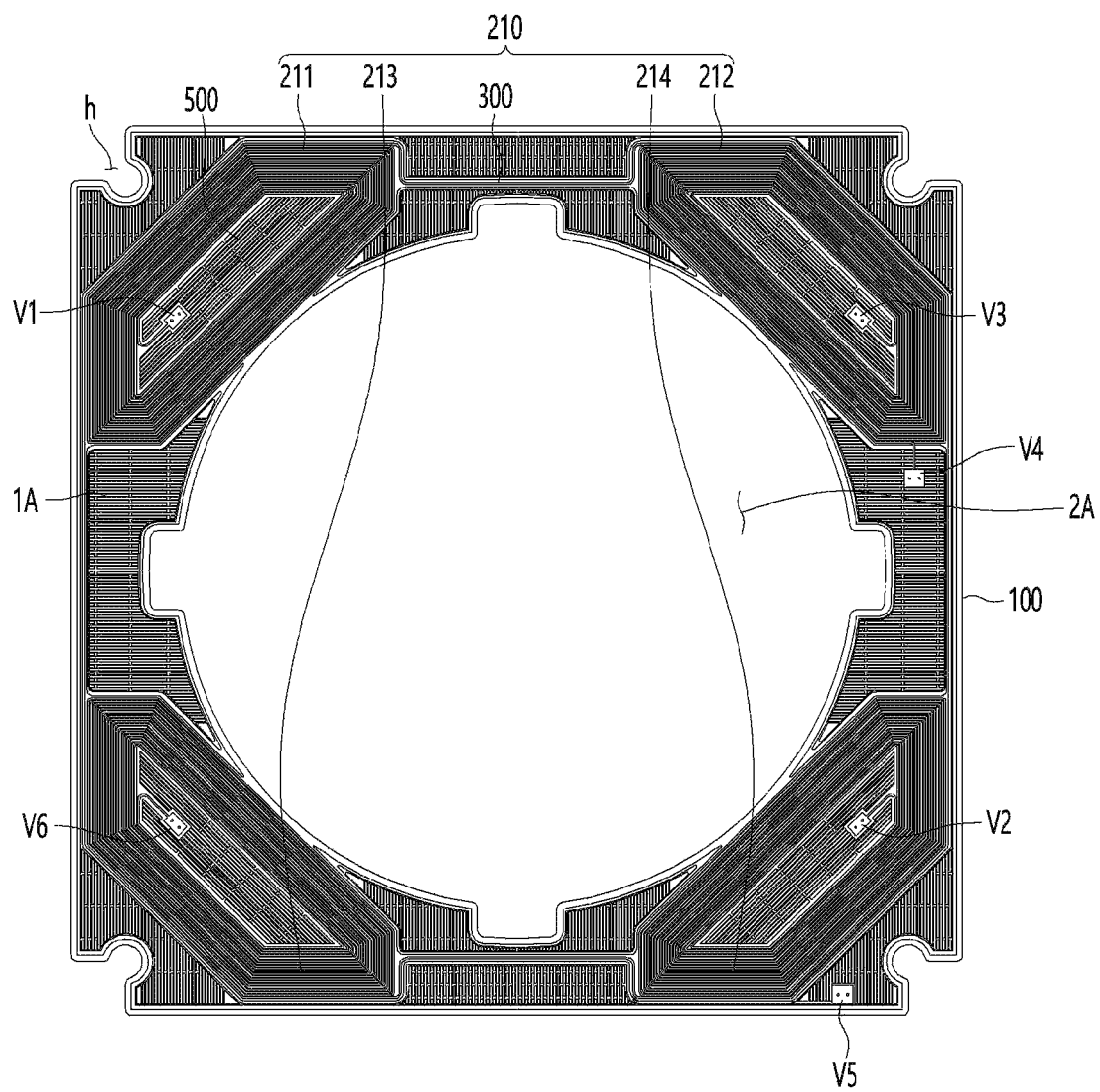

[FIG. 3]
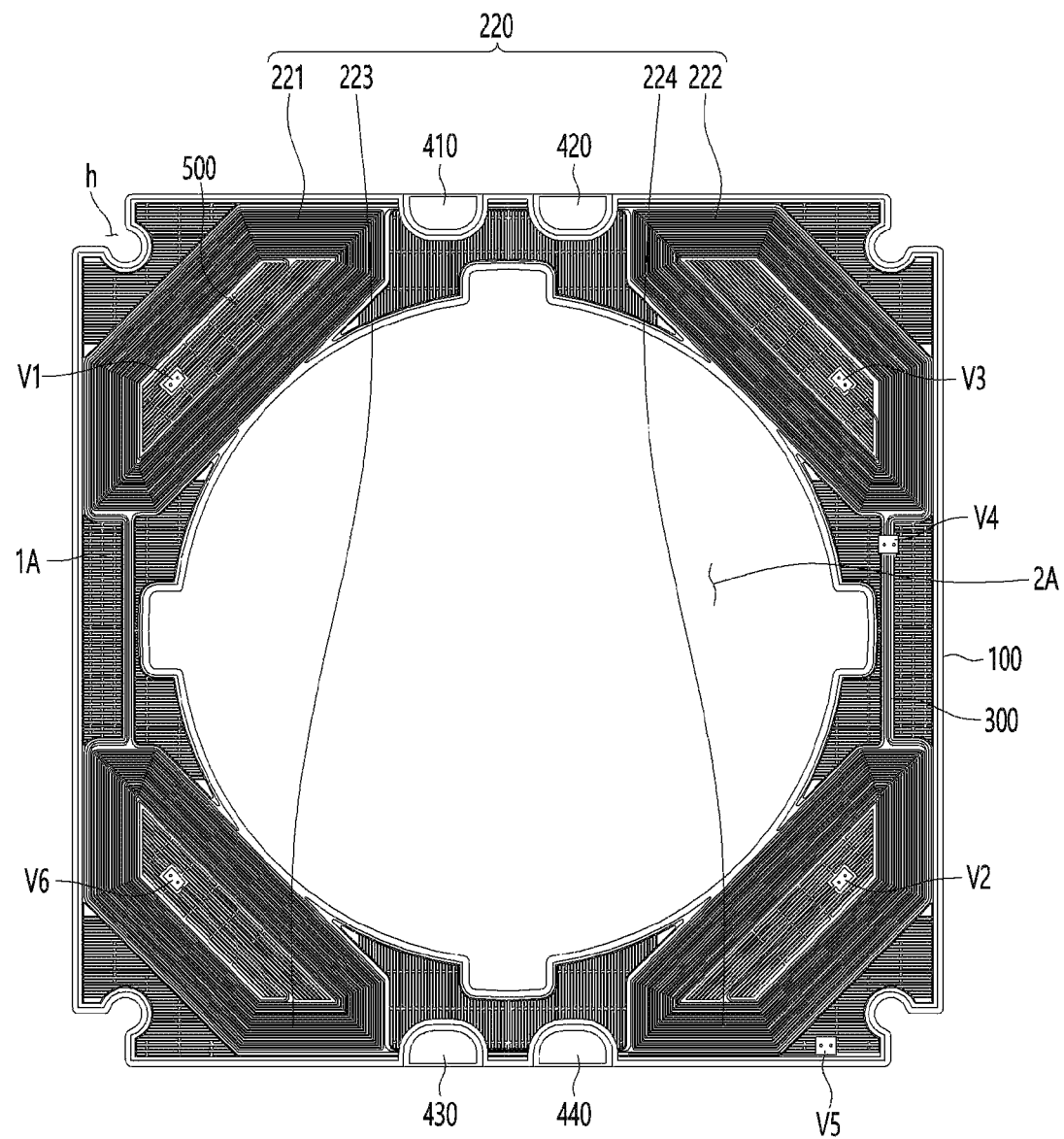

[FIG. 4]
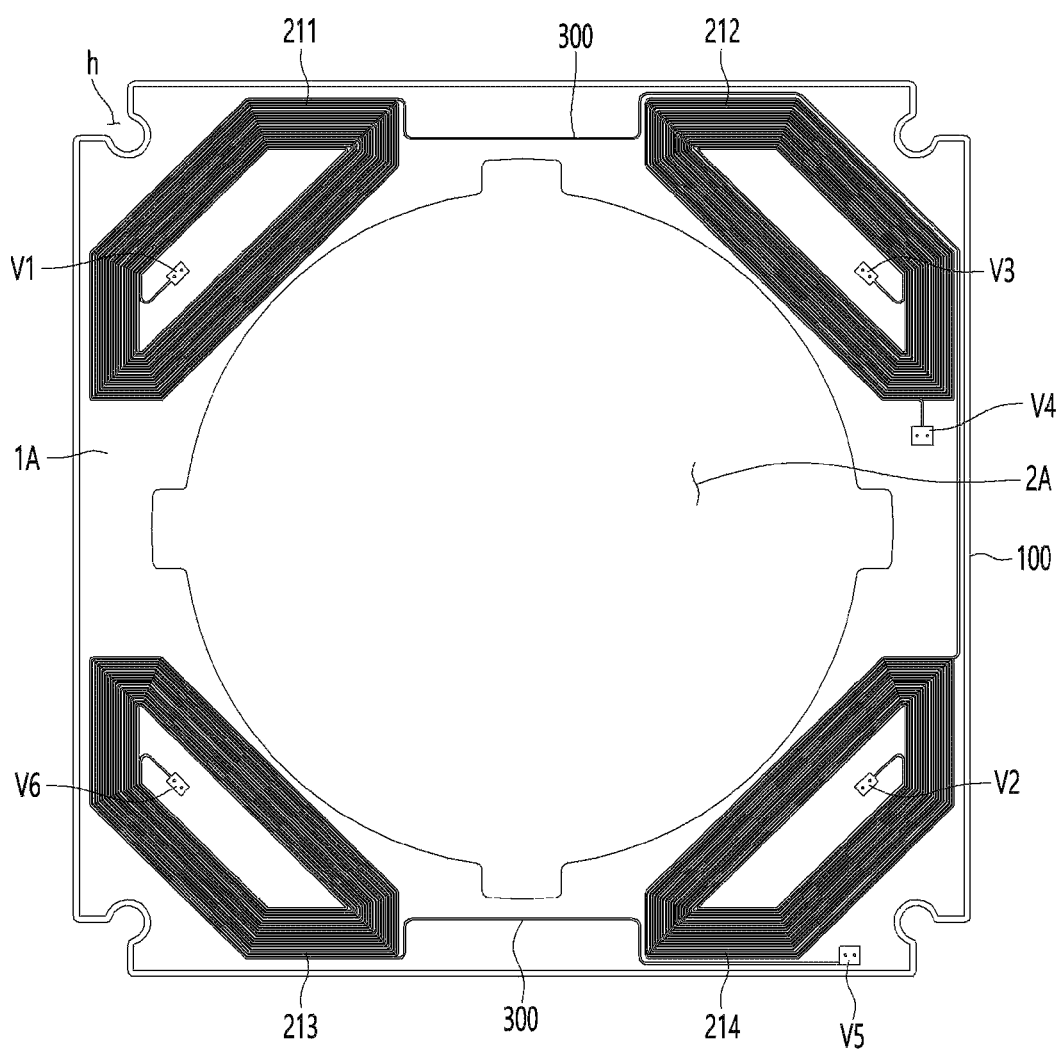

[FIG. 5]
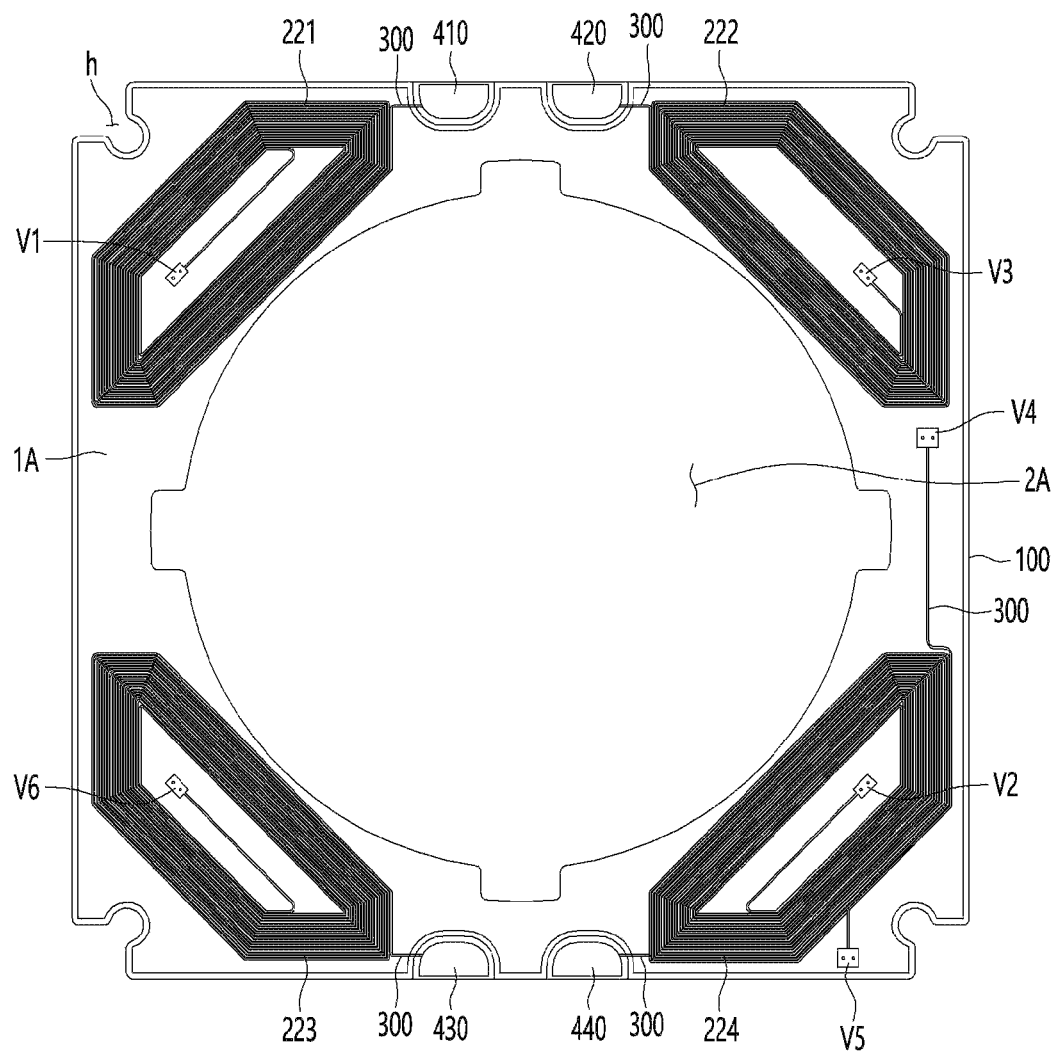

【FIG. 6】
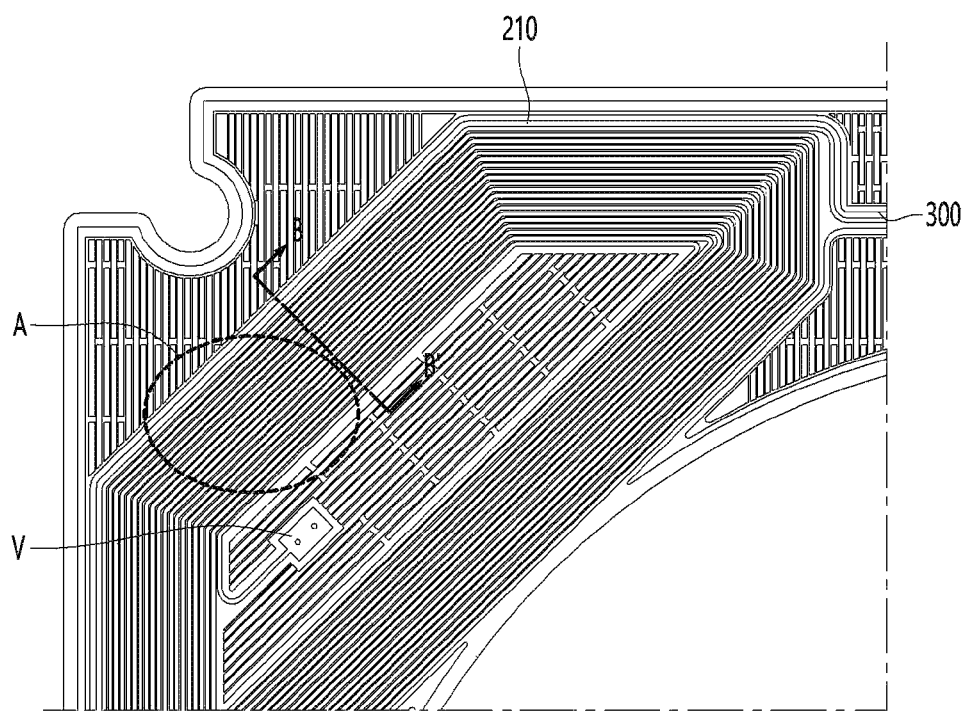
【FIG. 7】
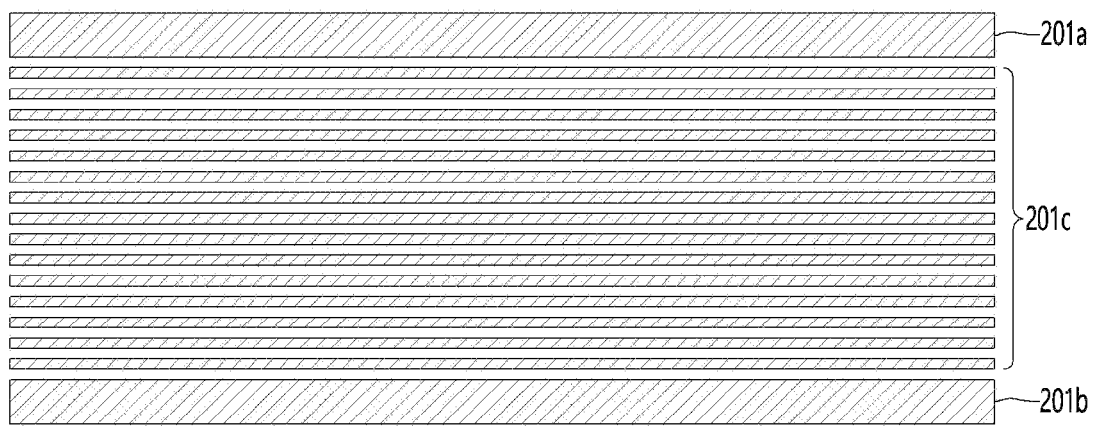

[FIG. 8]
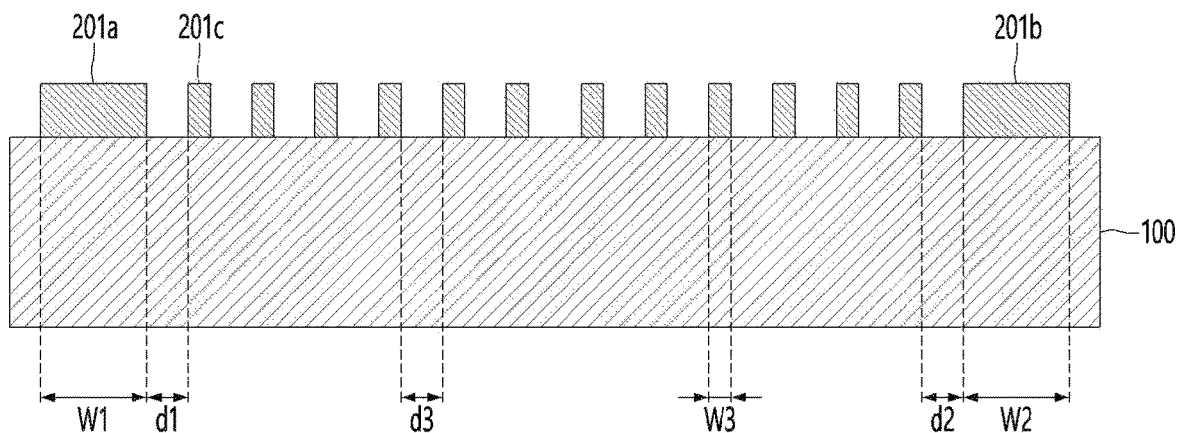
[FIG. 9]
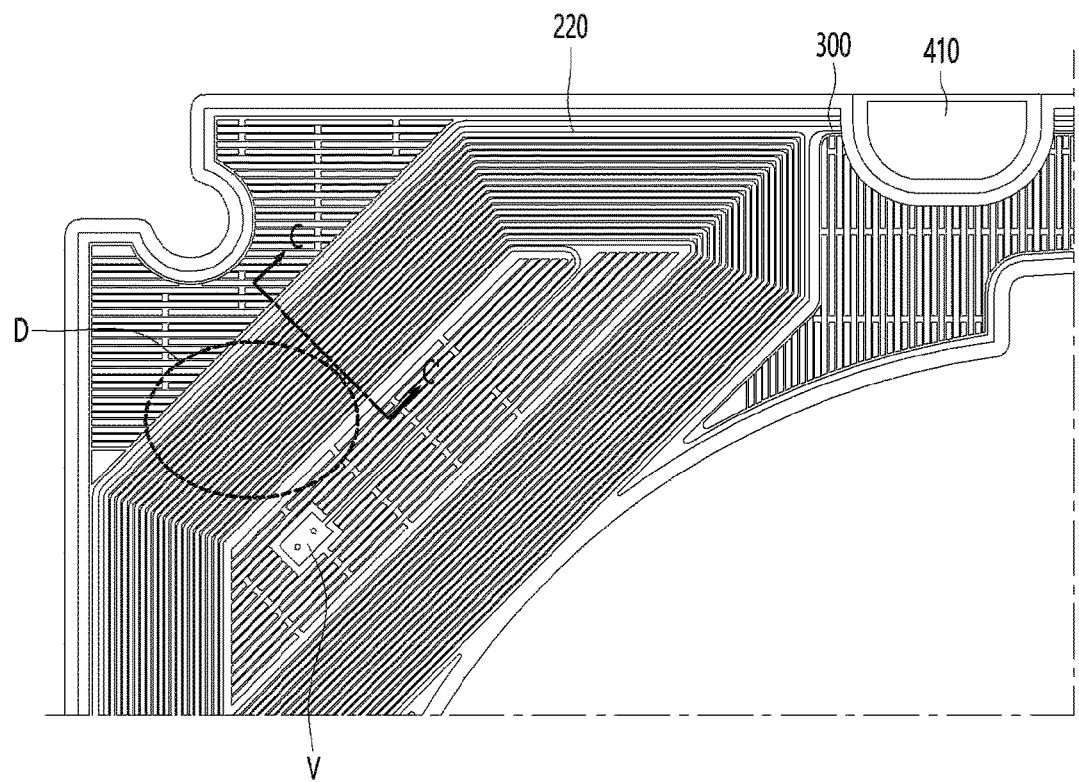

[FIG. 10]
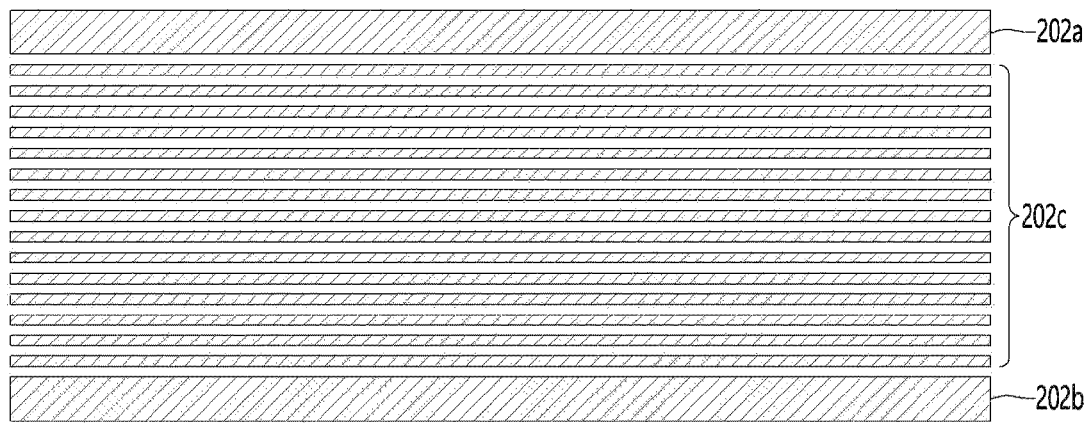
[FIG. 11]
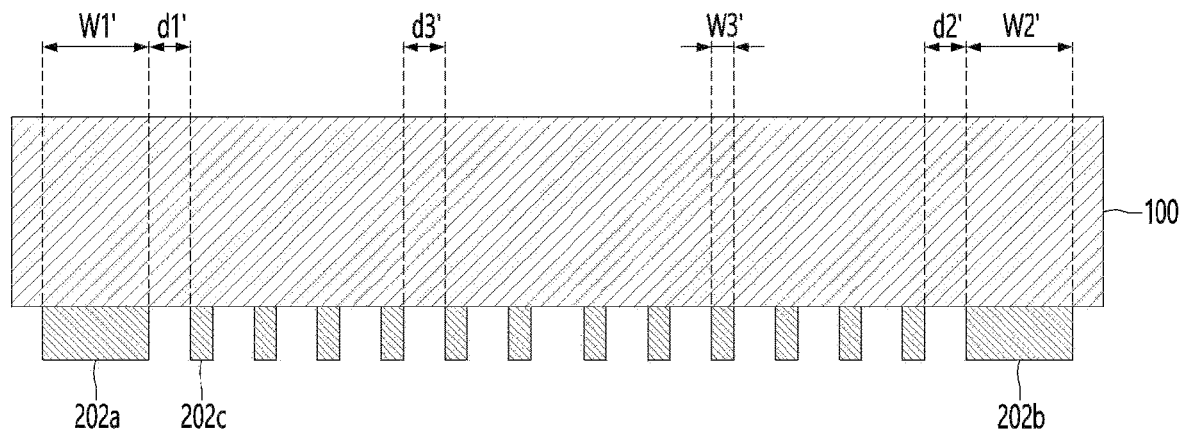

[FIG. 12]
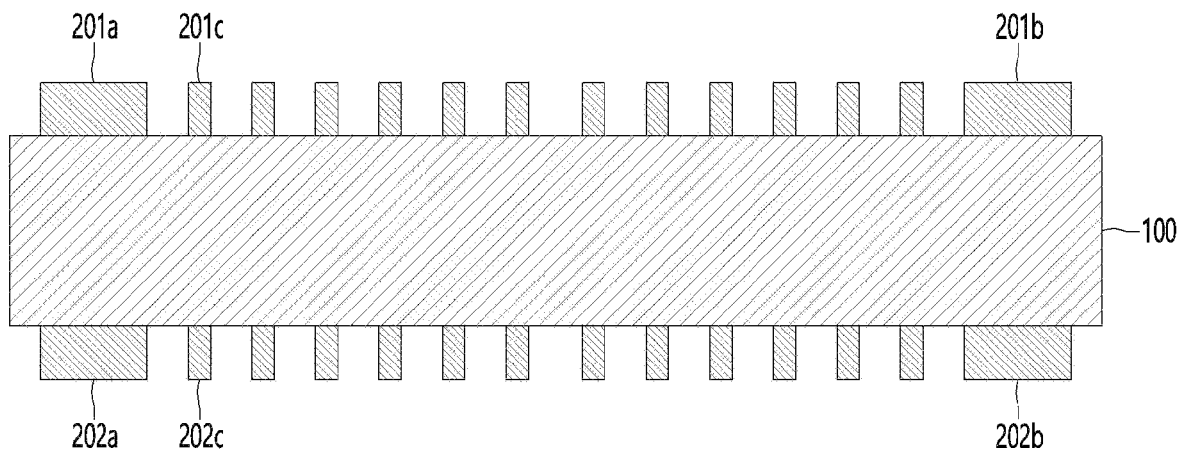
[FIG. 13]
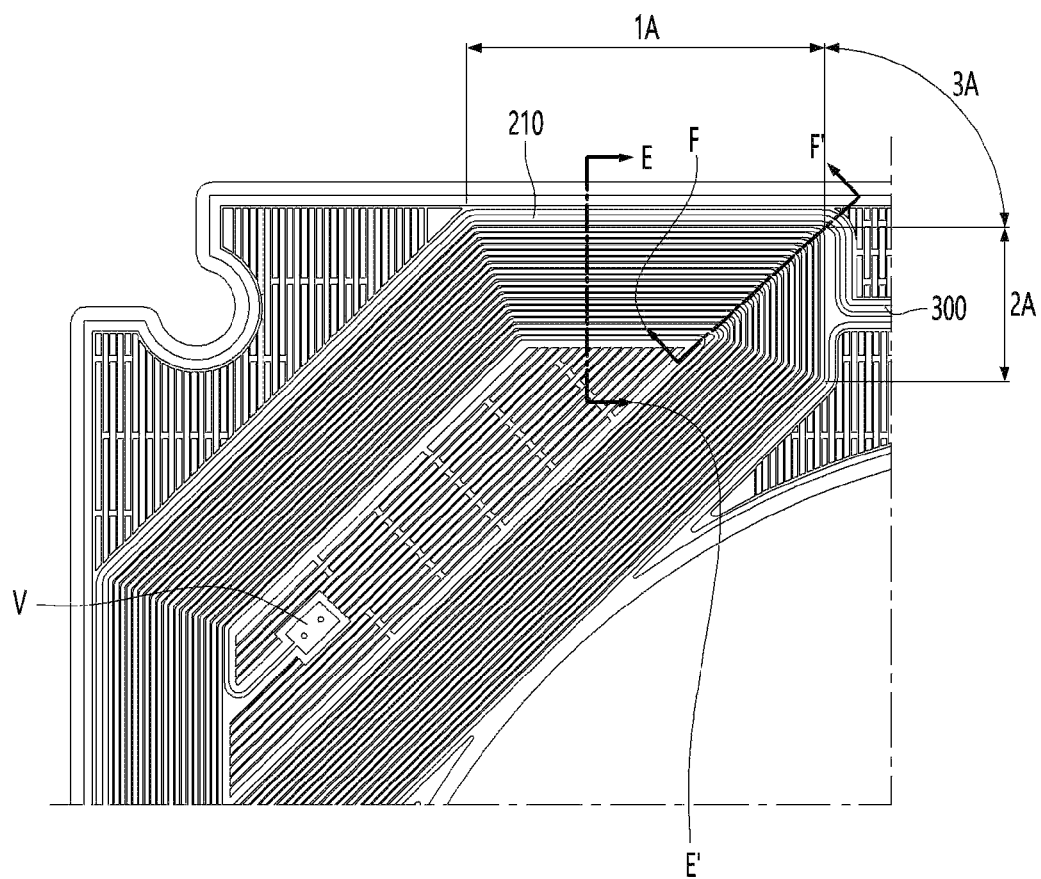

【FIG. 14】
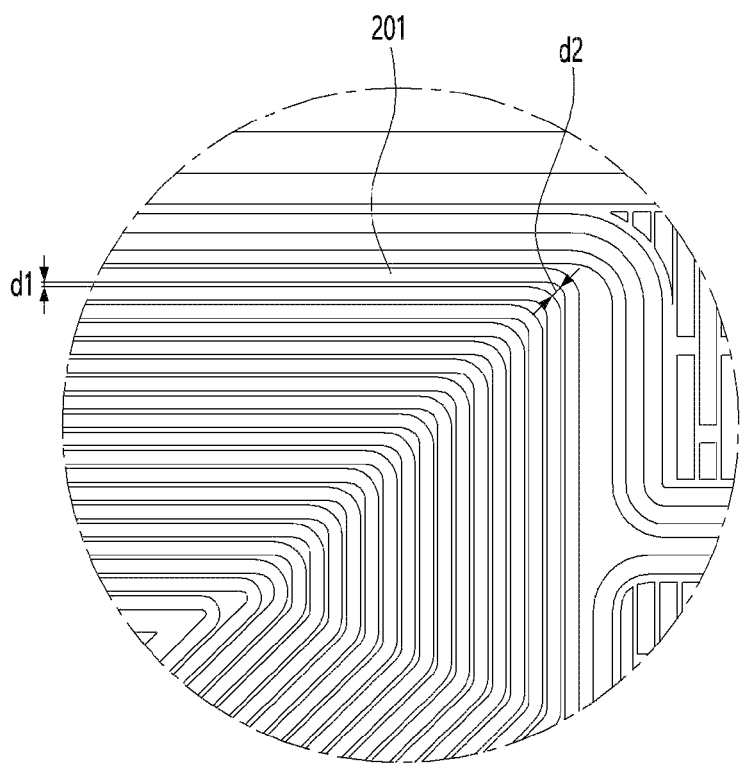
【FIG. 15】
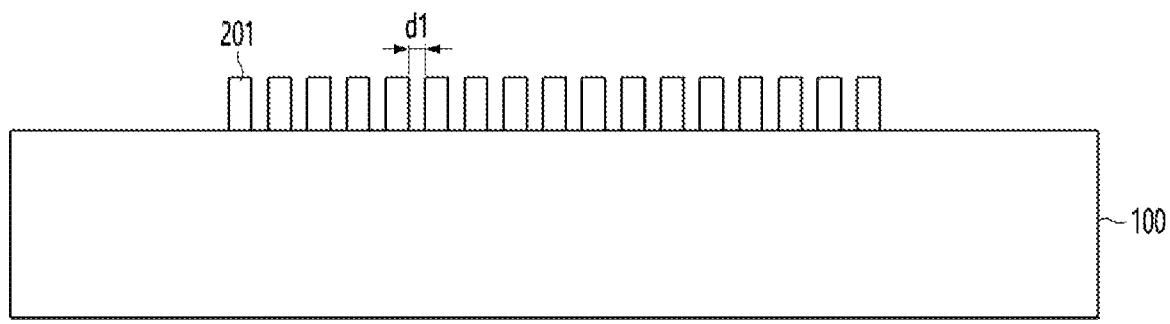

[FIG. 16]
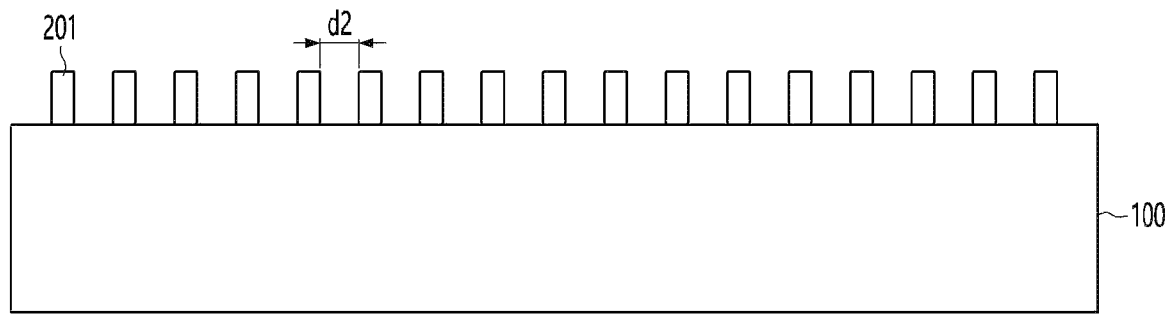
[FIG. 17]
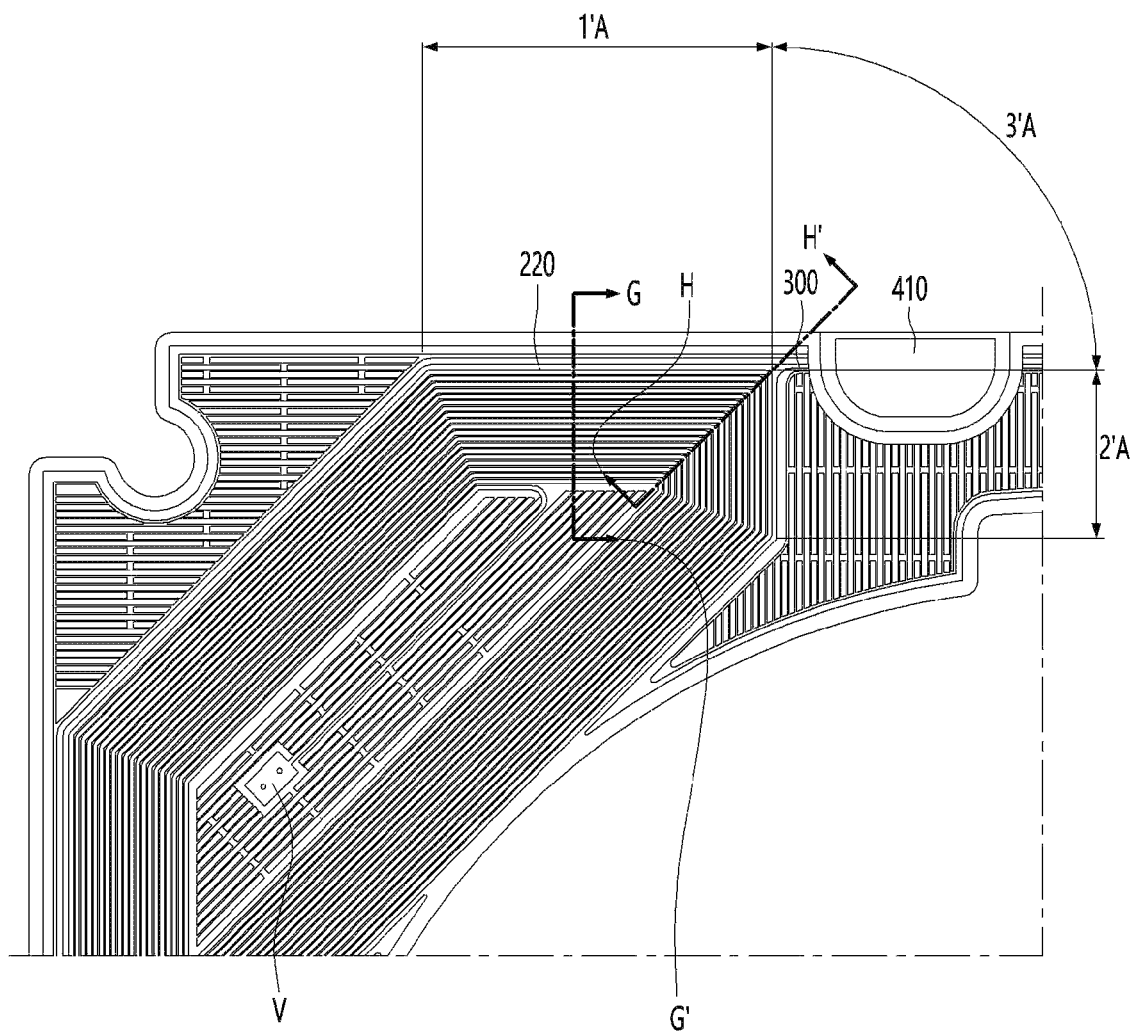

【FIG. 18】
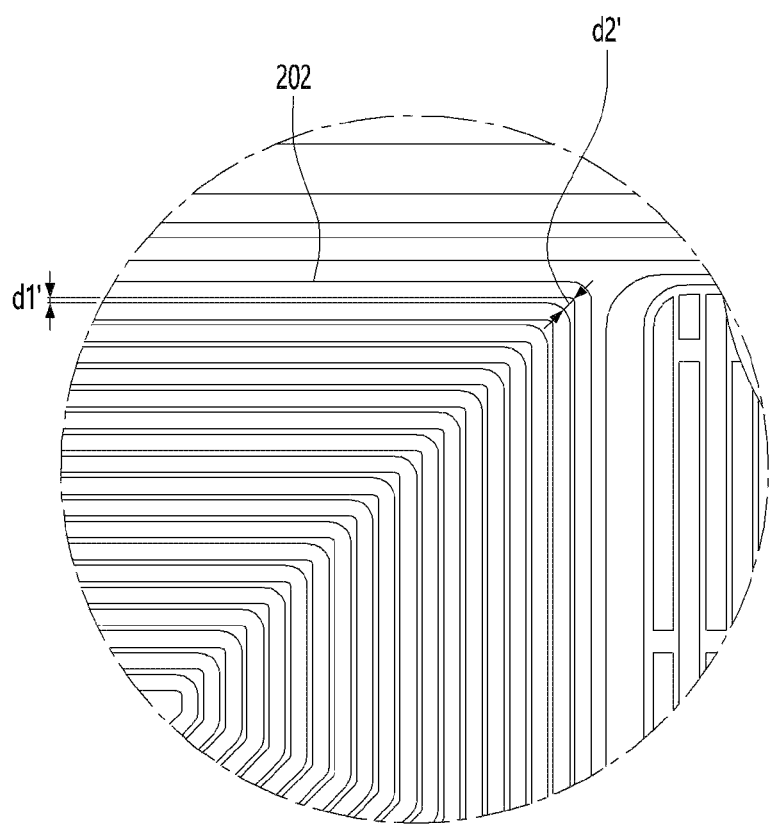
【FIG. 19】
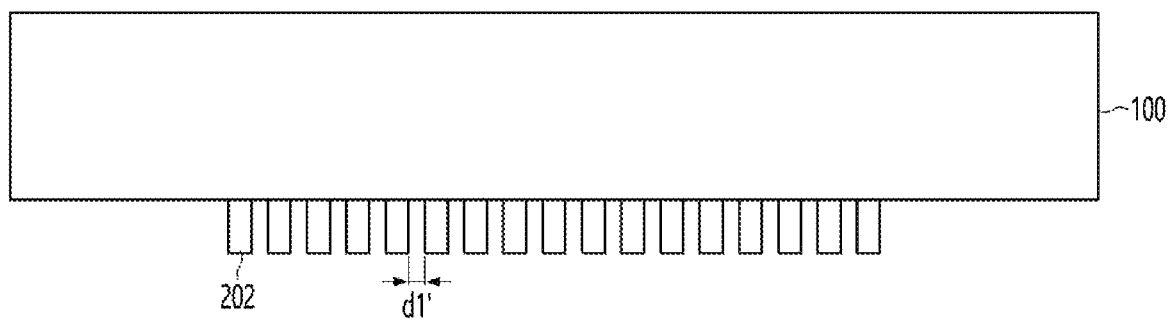

[FIG. 20]
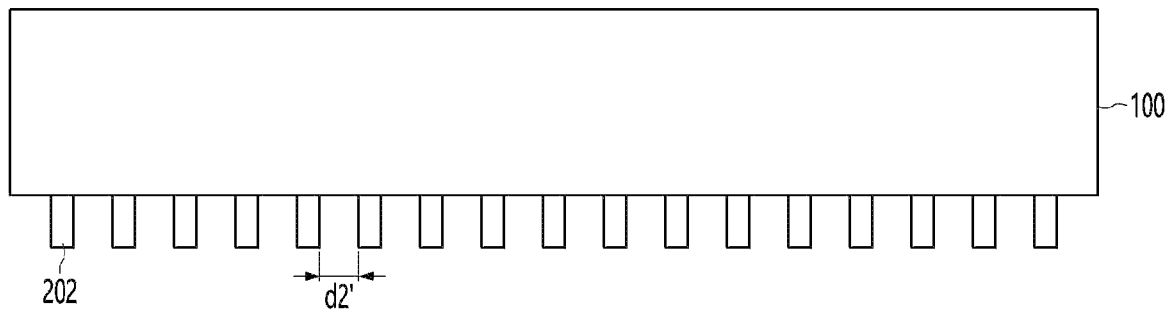

COIL MEMBER FOR CORRECTING HAND-SHAKE AND CAMERA MODULE HAVING THE SAME

CROSS-REFERENCE TO RELATED PATENT APPLICATIONS

This application is a U.S. National Stage Application under 35 U.S.C. § 371 of PCT Application No. PCT/KR2020/013703, filed Oct. 8, 2020, which claims priority to Korean Patent Application Nos. 10-2019-0128657 and 10-2019-0128666, both filed Oct. 16, 2019, whose entire disclosures are hereby incorporated by reference.

TECHNICAL FIELD

An embodiment relates to a coil member for correcting hand-shake and camera module including the same.

BACKGROUND ART

As the distribution of various types of portable terminals is widespread and wireless Internet services are commercialized, the demands of consumers related to portable terminals are also diversifying. Accordingly, various types of additional devices are being installed in the portable terminal.

Among them, a camera module is a representative example that can take a photo or video of a subject, store the image data, and edit and transmit it as needed.

In recent years, the demand for compact camera modules is increasing for use in various multimedia fields such as notebook personal computers, camera phones, PDA, smart devices, toys, etc., and for image input devices such as information terminals of surveillance cameras and video tape recorders.

Conventional camera modules may be classified into camera modules such as a fixed focus (F.F) type, an auto focus (A.F) type, and an optical image stabilization (OIS) type.

On the other hand, in the case of the OIS type, a coil pattern, etc. disposed on a circuit board may be provided as a component for realizing an anti-shake function. At this time, in order to control the electromotive force generated in the coil pattern, the resistance of the coil pattern should be reduced.

On the other hand, the resistance of the coil pattern increases as the length of the coil increases, and when the length of the coil is reduced, the resistance decreases, but there is a problem in that the electromotive force generated in the coil pattern is reduced and the characteristics are reduced.

Accordingly, a coil pattern having improved characteristics while reducing resistance and a camera module including the coil pattern are required.

DISCLOSURE

Technical Problem

An embodiment is to provide a coil pattern having improved characteristics and a camera module including the same.

Technical Solution

A coil member comprise a substrate comprising an upper surface and a lower surface opposite to the upper surface, a first coil electrode disposed on the upper surface of the substrate and including a first pattern electrode, and a second coil electrode disposed on the lower surface of the substrate and including a second pattern electrode, and the first coil electrode includes a first outermost pattern electrode, a first innermost pattern electrode, and a first center pattern electrode between the first outermost pattern electrode and the first innermost pattern electrode pattern, and at least one of a line width of the first outermost pattern electrode and A line width of the first innermost pattern electrode is greater than a line width of the first central pattern electrode.

Advantageous Effects

In a coil member according to an embodiment, the line width of the outermost and/or innermost patterned electrodes among the pattern electrodes of the coil electrode may be different from those of the central patterned electrode.

In detail, the line width of the outermost and/or innermost pattern electrodes among the pattern electrodes of the coil electrode may be formed to be larger than the line width of the central pattern electrode.

Accordingly, by increasing the line width of the coil electrode that changes the resistance of the coil electrode, the resistance of the coil electrode can be reduced.

Accordingly, by reducing the resistance of the coil electrode, it is possible to improve the characteristics of the coil member and the camera module including the same.

Also, in the coil member according to the embodiment, a plurality of unit coil electrodes may be connected through a plurality of via holes.

Accordingly, the length and disposal area of the connection electrodes connecting the unit coil electrodes can be reduced. Accordingly, it is possible to prevent an increase in resistance due to an increase in the length of the connection electrode.

Also, in the coil member according to the embodiment, the spacing between the pattern electrodes of the coil electrode may be formed differently for each region.

In detail, in the coil member, the interval between the pattern electrodes in the bent region of the coil electrode may be larger than that of the other regions.

Accordingly, when forming the coil electrode, it is possible to increase a line width of the photosensitive pattern, thereby preventing the photosensitive pattern from being weakly supported in the bent region from collapsing.

That is, the photosensitive pattern formed with a fine line width may be formed to be larger in the bending region than in other regions. Accordingly, it is possible to stably form the photosensitive pattern even in the bent region.

Accordingly, the coil member according to the embodiment may prevent short circuit of the coil electrode and non-uniformity of the pattern shape in the bending region. Accordingly, the coil member according to the embodiment may have improved reliability.

Also, in the coil member according to the embodiment, a plurality of unit coil electrodes may be connected through a plurality of via holes.

Accordingly, the length and disposal area of the connection electrodes connecting the unit coil electrodes can be reduced. Accordingly, it is possible to prevent an increase in resistance due to an increase in the length of the connection electrode, and it is possible to reduce the size of the coil member by minimizing the disposal area.

DESCRIPTION OF DRAWINGS

FIG. 1 is a view showing a perspective view of a camera module according to an embodiment.

FIG. 2 is view showing a top view of a coil member according to the embodiment.

FIG. 3 is view showing a bottom view of the coil member according to the embodiment.

FIGS. 4 and 5 are a view for explaining a connection relationship between coil electrodes of a coil member according to an embodiment.

FIG. 6 is view showing an enlarged view of an area of FIG. 2.

FIG. 7 is view showing a coil pattern in which area A of FIG. 6 is enlarged.

FIG. 8 is view showing a cross-sectional view taken along region B-B' of FIG. 6.

FIG. 9 is view showing an enlarged view of an area of FIG. 3.

FIG. 10 is view showing a coil pattern in which area C of FIG. 9 is enlarged.

FIG. 11 is view showing a cross-sectional view taken along a region D-D' of FIG. 9.

FIG. 12 is view showing a cross-sectional view of a coil member in which coil electrodes are formed on both surfaces of a substrate.

FIG. 13 is view showing an enlarged view of an area of FIG. 2 for explaining another embodiment.

FIG. 14 is view showing a coil pattern in which an area of FIG. 13 is enlarged.

FIG. 15 is view showing a cross-sectional view taken along region E-E' of FIG. 13.

FIG. 16 is view showing a cross-sectional view taken along an area F-F' of FIG. 13.

FIG. 17 is view showing an enlarged of an area of FIG. 3 for explaining another embodiment.

FIG. 18 is view showing a coil pattern in which an area of FIG. 17 is enlarged.

FIG. 19 is view showing a cross-sectional view taken along a region G-G' of FIG. 17.

FIG. 20 is view showing a cross-sectional view illustrating a region H-H' of FIG. 17.

MODES OF THE INVENTION

Hereinafter, embodiments of the present disclosure will be described in detail with reference to the accompanying drawings. However, the spirit and scope of the present disclosure is not limited to a part of the embodiments described, and may be implemented in various other forms, and within the spirit and scope of the present disclosure, one or more of the elements of the embodiments may be selectively combined and replaced.

In addition, unless expressly otherwise defined and described, the terms used in the embodiments of the present disclosure (including technical and scientific terms) may be construed the same meaning as commonly understood by one of ordinary skill in the art to which the present disclosure belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

FIG. 1 is a view showing a perspective view of a camera module according to an embodiment, And FIG. 2 is view showing a top view of a coil member according to the embodiment.

Referring to FIG. 1, a camera module 10 according to the embodiment includes a cover can 1100, a first mover 1200, a second mover 1300, a stator 1400, a base 1500, and an elastic unit 1600. In addition, although not shown in FIG. 14, the camera module 10 according to the embodiment may further include a printed circuit board, an IR filter, an image sensor, and the like.

The cover can 1100 accommodates the elastic unit 1600, the first mover 1200, the stator 1400, and the second mover 1300 and is mounted on the base 1500 to form an exterior of a lens driving motor. Specifically, an inner surface of the cover can 1100 is in close contact with some or all of side surfaces of the base 1500 to be mounted on the base 1500, and the cover can 1100 has a function of protecting internal components from external impacts and preventing penetration of external contaminants.

In addition, the cover can 1100 should also perform a function of protecting the lens driving motor or the components of the camera module from external radio wave interference generated by a mobile phone or the like. Therefore, the cover can 1100 is preferably formed of a metal material.

The cover can 1100 may be implemented as a yoke unit itself, which will be described below, or may be fixed by molding the yoke unit on the inside thereof. In addition, an opening 1110 through which a lens unit (not shown) is exposed may be formed on an upper surface of the cover can 1100, and an inner yoke (not shown) bent inside the cover can 1100 may be formed at a lower end portion of the upper surface of the cover can 1100. This inner yoke may be positioned in a concave portion 1213 formed in the bobbin 1210. In this case, the inner yoke may be disposed at a corner around the opening on an upper surface of the yoke portion or may be disposed on a side surface of the yoke portion, and the concave portion of the bobbin may be formed at a corresponding position.

In addition, the cover can 1100 may have a fastening piece 1120 formed so as to extend at least one on each surface of the lower end portion thereof, and it is possible to implement a more robust sealing function and fastening function of the lens driving motor by forming a fastening groove 1520 into which the fastening piece 1120 is inserted in the base 1500.

In addition, the fastening piece and the fastening groove may not be separately present, and only one of the two may be formed.

Meanwhile, the first mover 1200 is disposed on a side surface of the lens unit in order to move the lens unit (not shown). The first mover 1200 includes the bobbin 1210 for fixing the lens unit and a first coil member 1220 provided on an outer circumferential surface of the bobbin 1210.

The lens unit (not shown) may be a lens barrel provided with one or more lenses (not shown), but the embodiment is not limited thereto, and any holder structure capable of supporting the lens may be included.

An inner circumferential surface of the bobbin 1210 is coupled to an outer circumferential surface of the lens unit to fix the lens unit. In addition, the bobbin 1210 may have a guide part 1211, which guides the winding or mounting of the first coil member 1220, on an outer circumferential surface thereof. The guide part 1211 may be integrally formed with an outer surface of the bobbin 1210, and may be formed continuously along the outer surface of the bobbin 1210 or may be formed to be spaced apart at predetermined intervals.

In addition, a spring fastening protrusion 1212, to which an upper spring 1710 or a lower spring 1720 provided on the upper side of the base 1500 to support the bobbin 1210 is fastened, may be formed on the upper and lower surfaces of the bobbin 1210.

In addition, the bobbin 1210 may further include a concave portion 1213 formed on the outer circumferential surface thereof so that the inner yoke of the cover can 1100 may be positioned between the bobbin 1210 and the first coil member 1220 wound around the bobbin 1210.

In addition, the first coil member 1220 may be guided by the guide part 1211 and wound on the outer surface of the bobbin 1210, but four individual coils may be formed on the outer surface of the bobbin 1210 at 90° intervals. The first coil member 1220 may receive power applied from a printed circuit board (not shown) to be described later to form an electromagnetic field.

Meanwhile, the second mover 1300 may be positioned to face the first mover 1200 on a side surface of the first mover 1200 and may include a magnet part 1310 disposed so as to face the first coil member 1220 and a housing 1320 to which the magnet part 1310 is fixed.

Specifically, the magnet part 1310 may be mounted to the housing 1320 by an adhesive or the like so as to be disposed at a position corresponding to an outer surface of the first coil member 1220 and may be mounted on four corners inside the housing 1320 at equivalent intervals to promote efficient use of the internal volume.

The housing 1320 may be formed in a shape corresponding to an inner surface of the cover can 1100 forming the exterior of the lens driving motor. In addition, the housing 1320 may be formed of an insulating material and may be made as an injection molding product in consideration of productivity. The housing 1320 may be a moving part for OIS driving and may be disposed to be spaced apart from the cover can 1100 by a certain distance.

In the embodiment, the housing 1320 may be formed in a hexahedral shape to be spaced apart by a predetermined distance corresponding to a shape of the cover can 1100, and upper and lower sides of the housing 1320 may be opened to support the first mover 1200. In addition, the housing 1320 may include a magnet part fastening hole 1311 or a magnet part fastening groove formed in a shape corresponding to the magnet part 1310 on a side surface thereof.

In addition, at least two stoppers 1312 that are formed to protrude at a predetermined distance from an upper surface of the housing 1320 to be in contact with the upper surface of the cover can 1100 to enable to absorb an external impact may be formed. The stopper 1312 may be formed integrally with the housing 1320.

In addition, a spring fastening protrusion 1313 to which the upper spring 1710 or the lower spring 1720 provided on the upper side of the base 1500 to be described later so as to support the housing 1320 is fastened may be formed on the upper and lower surfaces of the housing 1320.

Meanwhile, the stator 1400 is positioned so as to face a lower side of the second mover 1300 in order to move the second mover 1300 and has through-holes 1411 and 1421 corresponding to the lens unit that are formed in a center thereof.

Specifically, the stator 1400 may include a second coil member 1410 positioned so as to face a lower side of the magnet part 1310 and a substrate on which the second coil member 1410 is disposed on the upper side to apply power, and an OIS chip is mounted, and the substrate may be a flexible printed circuit board 1420.

The second coil member 1410 may be mounted on the printed circuit board 1420 provided on the upper side of the base 1500 or formed on a flexible printed circuit board or a substrate, and the through-hole 1411 is formed in the center in order to pass a light signal of the lens unit (not shown). Meanwhile, when considering the miniaturization of the lens driving motor, specifically, lowering the height in a z-axis direction, which is an optical axis direction, the second coil member 1410 may be formed as a fine pattern (FP) coil that is a patterned coil and disposed on the flexible printed circuit board.

In the pattern coil of the second coil unit 1410, the line width of the pattern coil may be controlled in order to control the electromotive force of the pattern coil. That is, by increasing the line width of the pattern coil, it is possible to reduce the resistance of the pattern coil. The pattern coil will be described in detail below.

The flexible printed circuit board 1420 may be provided on an upper surface of the base 1500 to apply power to the second coil member 1410, and the through-hole 1421 corresponding to the through-hole 1411 of the second coil member 1410 is formed on the flexible printed circuit board 1420. In addition, the printed circuit board 1420 may include a terminal portion 1422 having one end or both ends facing each other bent to protrude to the lower side of the base 1500 and may be supplied with external power through the terminal portion 1422.

In addition, the embodiment may further include a hall sensor unit (not shown) mounted on a lower or upper surface of the printed circuit board 1420 so as to correspond to a position of the magnet part 1310.

The hall sensor unit senses an intensity and phase of a voltage applied to detect the movement of the magnet part 310 and a current flowing through the coil and interacts with the printed circuit board 1420 to be provided in order to precisely control the actuator.

The hall sensor unit may be provided on a straight line with respect to the magnet part 1310 and the optical axis direction, and since the hall sensor unit has to detect displacements in the x-axis and y-axis, the hall sensor unit may include two hall sensors respectively provided at adjacent two corners among corners of the printed circuit board 1420. A hall sensor receiving groove 1540 capable of accommodating the hall sensor may be formed in the base 1500. In addition, the hall sensor may be provided with one or more.

Although the hall sensor unit is provided closer to the second coil member 1410 than the magnet part 1310, considering that the strength of the magnetic field formed in the magnet part is several hundred times greater than the strength of the electromagnetic field formed in the coil, the influence of the second coil member 1410 in detecting the movement of the magnet part 1310 is not considered.

The lens unit is moved in all directions by the independent or organic interaction of the first mover 1200, the second mover 1300, and the stator 1400, so that the image focus of a subject is focused through the interaction of the first mover 1200 and the second mover 1300, and a camera shake and the like may be corrected by the interaction of the second mover 1300 and the stator 1400.

Meanwhile, the base 1500 supports the stator 1400 and the second mover 1300, and a hollow hole 1510 corresponding to the through-holes 1411 and 1421 is formed in a center thereof.

The base 1500 may function as a sensor holder to protect an image sensor (not shown) and may be provided to position an IR filter (not shown) at the same time. In this case, the IR filter may be mounted in the hollow hole 1510 formed in the center of the base 1500, and an infrared ray (IR) filter may be provided. In addition, the IR filter may be formed of, for example, a film material or a glass material, and an infrared blocking coating material may be disposed on a plate-shaped optical filter such as a cover glass for protecting an imaging surface, a cover glass, or the like. In addition, a separate sensor holder may be positioned under the base in addition to the base.

In addition, the base 1500 may be formed with one or more fixing protrusions 1530 protruding from an upper corner to face or couple to the inner surface of the cover can 1100, and such a fixing protrusion 1530 may easily guide fastening of the cover can 1100 and may achieve firm fixation after fastening. In addition, two or more fixing protrusions may be formed.

In addition, the base 1500 may have the fastening groove 1520 into which the fastening piece 1120 of the cover can 1100 is inserted. The fastening groove 520 may be formed locally on an outer surface of the base 1500 in a shape corresponding to a length of the fastening piece 1120 or may be formed entirely on the outer surface of the base 1500 so that a predetermined part of the lower end portion of the cover can 1100 including the fastening piece 1120 is inserted.

Hereinafter, the second coil member 1410 described above will be described in detail with reference to FIGS. 2 to 12.

The second coil member 1410 may be defined as a coil member including a substrate 100, a coil electrode 210 disposed on the substrate 100, and a dummy electrode 500. The coil member may be disposed on the flexible printed circuit board 1420 described above.

Referring to FIGS. 2 and 3, the coil member may include a substrate 100 and coil electrodes 210, 220 disposed on upper and lower surfaces of the substrate 100.

The substrate 100 may include a curved surface. In detail, the inner side of the substrate 100 may include a curved surface.

The substrate 100 may include a first region 1A and a second region 2A. In detail, the substrate 100 may include a first region 1A in which the coil electrodes 210, 220 and the dummy electrode 500 are disposed, and a second region 2A in which the coil electrodes 210, 220 and the dummy electrode 500 are not disposed.

The first area 1A may be defined as an area of the upper surface and the other surface of the substrate 100. In addition, the second region 2A may be defined as a hole region penetrating the upper surface and the other surface of the substrate 100.

The hole of the second region 2A may be a region corresponding to the through hole 1421 described above. That is, the second region 2A of the substrate 100 may correspond to the lens unit and may be formed in the center of the substrate penetrating the substrate 100.

Also, the first region 1A may be formed to surround the second region 2A. A plurality of coupling holes h for coupling with the FPCB disposed under the coil member may be formed in the first region 1A. In detail, a plurality of coupling holes h to be coupled to the FPCB disposed under the coil member may be formed in a corner region of the substrate 100.

The substrate 100 may be a flexible substrate. That is, the substrate 100 may include a flexible plastic. For example, the substrate 100 may be a polyimide (PI) substrate. However, the embodiment is not limited thereto, and may be a substrate made of a polymer material such as polyethylene terephthalate (PET) or polyethylene naphthalate (PEN). Accordingly, the flexible circuit board including the substrate 100 can be used in various electronic devices provided with curved display devices.

The substrate 100 may be an insulating substrate. That is, the substrate 100 may be an insulating substrate supporting various wiring patterns.

The substrate 100 may have a thickness of 20 μm to 100 μm. For example, the substrate 100 may have a thickness of 25 μm to 50 μm. For example, the substrate 100 may have a thickness of 30 μm to 40 μm. When the thickness of the substrate 100 exceeds 100 μm, the overall thickness of the coil member may increase. In addition, when the thickness of the substrate 100 is less than 20 μm, the substrate 100 may be vulnerable to heat/pressure, etc. in the process of forming the coil electrode of the substrate 100.

Referring to FIGS. 2 and 3, a coil electrode 200 may be disposed on the substrate 100. In detail, referring to FIG. 2, a plurality of first coil electrodes 210 may be disposed on the upper surface of the substrate 100. Also, referring to FIG. 3, a plurality of second coil electrodes 220 may be disposed on the lower surface of the substrate 100.

The first coil electrode 210 may include a plurality of first pattern electrodes spaced apart from each other. Also, the second coil electrode 220 may include a plurality of second pattern electrodes spaced apart from each other.

Referring to FIG. 2, four first coil electrodes 210 may be disposed on the upper surface of the substrate 100. In detail, a plurality of first coil electrodes 210 may be disposed to be spaced apart from each other in a region corresponding to the edge region of the substrate 100 on the upper surface of the substrate 100. That is, each of the first coil electrodes 210 may be disposed on a region corresponding to the coupling hole h.

In detail, a 1-1 coil electrode 211, a 1-2 coil electrode 212, a 1-3 coil electrode 213, and a 1-4 coil electrode 214 are formed on the upper surface of the substrate 100.

The 1-1 coil electrode 211, the 1-2 coil electrode 212, the 1-3 coil electrode 213, and the 1-4 coil electrode 214 may be disposed to be spaced apart from each other on the upper surface of the substrate 100.

Each of the 1-1 coil electrode 211, the 1-2 coil electrode 212, the 1-3 coil electrode 213, and the 1-4 coil electrode 214 may be formed in a trapezoidal shape on the upper surface of the substrate 100. In detail, the 1-1 coil electrode 211, the 1-2 coil electrode 212, the 1-3 coil electrode 213, and the 1-4 coil electrode 214 may be formed in a trapezoidal shape with a short side outside the substrate 100 and a long side facing the short side inside the substrate 100. That is, the trapezoidal shape of the 1-1 coil electrode 211, the 1-2 coil electrode 212, the 1-3 coil electrode 213, and the 1-4 coil electrode 214 may be formed so that the width of the trapezoidal shape increases while extending from the edge of the substrate 100 toward the center of the substrate 100.

The plurality of first coil electrodes 210 may be disposed in pairs to face each other. For example, the 1-1 coil electrode 211 and the 1-4 coil electrode 214 are disposed to face each other in a diagonal direction, and the 1-2 coil electrodes 212 and the 1-3 coil electrodes 213 may be disposed to face each other in a diagonal direction.

The 1-1 coil electrode 211 and the 1-4 coil electrode 214 may be connected to each other through a connection electrode 300 connected to the 1-1 coil electrode 211 and the 1-4 coil electrode 214, the second coil electrode 220, and a plurality of via holes.

Also, referring to FIG. 3, four second coil electrodes 220 may be disposed on the lower surface of the substrate 100. In detail, a 2-1 coil electrode 221, a 2-2 coil electrode 222, a 2-3 coil electrode 223, and a 2-4 coil electrode 224 are disposed on the lower surface of the substrate 100.

The 2-1 coil electrode 221, the 2-2 coil electrode 222, the 2-3 coil electrode 223, and the 2-4 coil electrode 224 may be disposed to be spaced apart from each other on the lower surface of the substrate 100.

Each of the 2-1 coil electrode 221, the 2-2 coil electrode 222, the 2-3 coil electrode 223, and the 2-4 coil electrode 224 may be formed in a trapezoidal shape on the upper surface of the substrate 100. In detail, the 2-1 coil electrode 221, the 2-2 coil electrode 222, the 2-3 coil electrode 223, and the 2-4 coil electrode 224 may be formed in a trapezoidal shape with a short side outside the substrate 100 and a long side facing the short side inside the substrate 100. That is, the trapezoidal shape of the 2-1 coil electrode 221, the 2-2 coil electrode 222, the 2-3 coil electrode 223, and the 2-4 coil electrode 224 may be formed so that the width of the trapezoidal shape increases while extending from the edge of the substrate 100 toward the center of the substrate 100.

The plurality of first coil electrodes 220 may be disposed in pairs to face each other. For example, the 2-1 coil electrode 221 and the 2-4 coil electrode 224 are disposed to face each other in a diagonal direction, and the 2-2 coil electrodes 222 and the 2-3 coil electrodes 223 may be disposed to face each other in a diagonal direction.

The 2-1 coil electrode 221 and the 2-4 coil electrode 224 may be connected to a first wiring unit 410 and a fourth wiring unit 440 on the lower surface of the substrate 100.

The 2-2 coil electrode 222 and the 2-3 coil electrode 223 may be connected to a second wiring unit 420 and a third wiring unit 430 on the lower surface of the substrate 100.

The first wiring unit 410, the second wiring unit 420, the third wiring unit 430, and the fourth wiring unit 440 may be disposed only on the lower surface of the substrate 100. In detail, the first wiring unit 410, the second wiring unit 420, the third wiring unit 430, and the fourth wiring unit 440 may be disposed only on the lower surface of the substrate 100 facing the flexible printed circuit board 1420.

The first wiring unit 410, the second wiring unit 420, the third wiring unit 430, and the fourth wiring unit 440 may include the same or similar material to the first coil electrode, the second coil electrode, and the dummy electrode.

In detail, the first wiring unit 410, the second wiring unit 420, the third wiring unit 430, and the fourth wiring unit 440 include copper (Cu). However, embodiments are not limited thereto, and the first wiring unit 410, the second wiring unit 420, the third wiring unit 430, and the fourth wiring unit 440 may include at least one of copper (Cu), aluminum (Al), chromium (Cr), nickel (Ni), silver (Ag), and molybdenum (Mo). At least one of gold (Au), titanium (Ti), and alloys thereof.

In addition, a surface treatment layer may be further disposed on the outer surfaces of the first wiring unit 410, the second wiring unit 420, the third wiring unit 430, and the fourth wiring unit 440. In detail, a surface treatment layer disposed to surround the wiring unit may be disposed on the outer surfaces of the first wiring unit 410, the second wiring unit 420, the third wiring unit 430, and the fourth wiring unit 440.

The surface treatment layer may include tin (Sn). When the surface treatment layer is formed on the outer surface of the wiring part, since the corrosion resistance of tin (Sn) is excellent, oxidation of the wiring part is prevented and the reliability of the coil member can be improved.

The first coil electrode 210 and the second coil electrode 220 may be disposed at positions corresponding to each other on the upper and lower surfaces of the substrate 100.

That is, the 1-1 coil electrode 211 and the 2-1 coil electrode 221 may be disposed at positions corresponding to each other on the upper and lower surfaces of the substrate 100. Also, the 1-2 coil electrode 212 and the 2-2 coil electrode 222 may be disposed at positions corresponding to each other on the upper and lower surfaces of the substrate 100. Also, the 1-3 coil electrode 213 and the 2-3 coil electrode 223 may be disposed at positions corresponding to each other on the upper and lower surfaces of the substrate 100. Also, the 1-4 coil electrode 214 and the 2-4 coil electrode 224 may be disposed at positions corresponding to each other on the upper and lower surfaces of the substrate 100.

That is, the coil electrodes disposed on the top and bottom surfaces of the substrate 100 may be disposed at positions corresponding to each other on the top and bottom surfaces of the substrate 100, and may be disposed at positions overlapping each other in the thickness direction of the substrate.

On the other hand, the first coil electrode 210 and the second coil electrode 220 form a photosensitive pattern formed of a photosensitive film on the substrate 100, and then the first coil electrode 210 and the second coil electrode 220 may be formed to have a predetermined thickness between the photosensitive patterns through an electrolytic or electroless plating process.

For example, after a photosensitive material is formed on one surface of a substrate including an insulating material and the other surface opposite to the one surface, the photosensitive material is etched to form a plurality of photosensitive patterns spaced apart from each other.

And then, after disposing a seed layer between the photosensitive material patterns, a plating layer forming a coil electrode may be disposed through an electrolytic plating process. That is, the plating layer may be formed of at least two layers.

The plating layer may include copper (Cu). However, embodiments are not limited thereto, and the plating layer may include at least one of copper (Cu), aluminum (Al), chromium (Cr), nickel (Ni), silver (Ag), or molybdenum (Mo). gold (Au), titanium (Ti), and alloys thereof.

Then, by peeling the photosensitive pattern, first and second coil electrodes spaced apart from each other and each having a constant line width and thickness may be formed on both surfaces of the substrate.

Alternatively, the plating layer may be formed by another method.

In detail, after the photosensitive material is formed on one surface of the substrate including the insulating material and the other surface opposite to the one surface, the photosensitive material is etched to form a plurality of photosensitive patterns spaced apart from each other.

And then, after disposing a seed layer between the photosensitive material patterns, a plating layer forming a coil electrode may be disposed through an electrolytic plating process. That is, the plating layer may be formed of at least two layers.

The plating layer may include copper (Cu). However, embodiments are not limited thereto, and the plating layer may include at least one of copper (Cu), aluminum (Al), chromium (Cr), nickel (Ni), silver (Ag), or molybdenum (Mo). gold (Au), titanium (Ti), and alloys thereof.

Then, the photosensitive pattern may be peeled off, and the seed layer may be removed through flash etching.

Then, a plurality of plating layers may be formed on the plating layer by an electrolytic plating process to form first and second coil electrodes formed as multi-layer plating layers.

In this case, since the shape of the plating layer formed after peeling the photosensitive pattern is not controlled by the photosensitive pattern, the upper surface of the plating layer may include a curved surface.

Meanwhile, the first coil electrode 210 and the second coil electrode 220 may be electrically connected through the connection electrode 300 and a plurality of via holes.

In detail, a plurality of via holes may be formed on the substrate 100. For example, at least one via hole formed in the inner region of the first coil electrode 210 and the second coil electrode 220 may be disposed on the substrate 100. And at least one via hole formed in an outer region of the first coil electrode 210 and the second coil electrode 220 may be disposed on the substrate 100.

FIGS. 4 and 5 are views for explaining a connection relationship between the first coil electrode 210 and the second coil electrode 220, in which the dummy electrode 500 disposed on the substrate is omitted.

Referring to FIGS. 4, 5, the 1-1 coil electrode 211, the 1-4 coil electrode 214, the 2-1 coil electrode 221 and the 2-4 coil electrode 214 of the X channel may be connected in a direction from the first wiring unit 410 to the fourth wiring unit 440 through a plurality of connection electrodes and via holes.

And, the 1-2 coil electrode 212, the 1-3 coil electrode 213, the 2-2 coil electrode 222 and the 2-3 coil electrode 223 of the Y channel may be connected in a direction from the second wiring unit 420 to the third wiring unit 430 through a plurality of connection electrodes and via holes.

In detail, the current applied in the direction of the first wiring unit 410 moves to the 2-1 coil electrode 221 through the connection electrode 300. Then, it moves to the inside of the 2-1 coil electrode 221 and moves to the 1-1 coil electrode 211 through the first via hole V1. Then, it moves to the outside of the 1-1 coil electrode 211 and moves to the 1-4 coil electrode 214 through the connection electrode 300. Then, it moves to the inside of the 1-4 coil electrode 214 and moves to the 2-4 coil electrode 224 through the second via hole V2. Then it may move to the outside of the 2-4 coil electrode 224 to be connected to the fourth wiring unit 440 through the connection electrode.

In this case, the first via hole V1 and the second via hole V2 may be formed in an inner region of the coil electrode.

In addition, the current applied in the direction of the second wiring part 420 moves to the 2-2 coil electrode 222 through the connection electrode 300. Then, it moves to the inside of the 2-2 coil electrode 222 and moves to the 1-2 coil electrode 212 through the third via hole V3. Then, it moves to the outside of the 1-2 coil electrodes 212, and passes through the fourth via hole V4, the fifth via hole V5 and the connection electrode 300 to the 1-3 coil electrode 213. Then, it moves to the inside of the 1-3 coil electrode 213 and moves to the 2-3 coil electrode 223 through the sixth via hole V6. Then, it may move to the outside of the 2-3 coil electrode 223 to be connected to the third wiring unit 430 through the connection electrode.

In this case, the third via hole V3 and the sixth via hole V6 may be formed in the inner region of the coil electrode, and the fourth via hole V4 and the fifth via hole V5 may be formed in an outer region of the coil electrode.

That is, the X channel and the Y channel may be respectively connected to the first coil electrode 210 and the second coil electrode 220 through a connection electrode and a plurality of via holes. In particular, the length of the connection electrode may be reduced through the plurality of via holes. Accordingly, by minimizing the length of the connection electrode, the size of the coil member can be reduced. In addition, by reducing the length of the connection electrode, it is possible to prevent an increase in resistance according to an increase in the length of the connection electrode, thereby improving the characteristics of the coil member.

Meanwhile, in the coil member according to the embodiment, the resistance of the coil member may be reduced by differently controlling the line widths of the pattern electrodes of the first coil electrode and the second coil electrode for each region.

Referring to FIG. 6, the first coil electrode 210 may be extend in one direction while having a plurality of bent regions. Accordingly, the first coil electrode 210 may be formed in a coil pattern shape as a whole. For example, the pattern electrode of the first coil electrode 210 may be formed as a coil-shaped electrode while being extend in one direction from the outside to the inside or from the inside to the outside.

The first coil electrode 210 generates an electromotive force by changing a magnetic flux due to a change in current. The magnetic flux generated by the first coil electrode 210 may be proportional to an inductance and a flowing current as shown in the following equations. In addition, the electromotive force may be affected by the resistance of the circuit, and as the cross-sectional area of the first coil electrode 210 increases, the resistance may be decreased.

$$\Phi = Li \quad \text{[Equation 1]}$$

$$L = \mu N^2 A / l \quad \text{[Equation 2]}$$

$$\text{Resistance} = l / \text{conductivity} * A \quad \text{[Equation 3]}$$

(In Equations 1 to 3, Φ is the magnetic flux, L is the inductance, N is the number of turns of the coil electrode, l is the length of the coil, and A is the area (line width*thickness of the coil electrode).)

That is, in order to reduce the resistance of the circuit, it is necessary to increase the cross-sectional area of the first coil electrode 210 or decrease the length of the first coil electrode 210. However, when the length of the first coil electrode 210 is reduced, the magnetic flux by the first coil electrode is reduced, so that the electromotive force is reduced, and thus characteristics may be reduced.

Accordingly, the coil member according to the embodiment may increases the cross-sectional area of the first coil electrode 210 by increasing the line width of the first coil electrode 210 while maintaining the length of the first coil electrode 210. Accordingly, it is possible to reduce the resistance of the coil member.

Referring to FIGS. 6 to 8, the first coil electrode 210 may include a plurality of first pattern electrodes spaced apart from each other. The pattern electrodes of the first coil electrode 210 may be divided according to respective positions of the pattern electrodes. For example, when a region close to the second region 2A is defined inside and a region close to the coupling hole h is defined outside, the first coil electrode 210 may include a first outermost pattern 201*a*, a first innermost patterned electrode 201*b*, and a first center patterned electrode 201*c*.

In detail, the first outermost pattern electrode 201*a* may be defined as an outermost pattern electrode of the pattern electrode, and the first innermost pattern electrode 201*b* may be defined as an innermost pattern electrode of the pattern electrode.

The dummy electrodes 500 may be disposed between the first innermost pattern electrodes 201*b* facing each other. Also, the dummy electrodes 500 may be disposed outside the first outermost pattern 201*a*.

The dummy electrode 500 may make the plating thickness of each of the pattern electrodes of the first coil electrode 210 and the second coil electrode 220 uniform.

In detail, when only a photosensitive pattern for forming the first coil electrode 210 and the second coil electrode 220 is formed on the substrate 100, it may be difficult to uniformly control the overall plating thickness of the pattern electrodes of the first coil electrode 210 and the second coil electrode 220. Accordingly, in addition to the pattern electrodes of the first coil electrode 210 and the second coil electrode 220, a photosensitive pattern of a pattern electrode, which is a dummy electrode, may be additionally formed. Thereby, the plating area can be made uniform in each area of the substrate. Accordingly, the plating thickness of the pattern electrodes of the first coil electrode 210 and the second coil electrode 220 may be uniform.

That is, the dummy electrode 500 may be partially or entirely formed in a region other than the region where the first coil electrode 210 and the second coil electrode 220 are formed.

The first outermost pattern electrode 201*a*, the first innermost pattern electrode 201*b*, and the first center pattern electrode 201*c* may be defined as regions overlapping the magnet part 1310. In detail, the first outermost pattern electrode 201*a*, the first innermost pattern electrode 201*b*, and the first center pattern electrode 201*c* of the first coil electrode 210 may vertically overlap the magnet part 1310 disposed on the coil member.

In detail, the entire region of the first outermost pattern electrode 201*a* may be disposed to overlap the magnet portion 1310. Alternatively, one region of the first outermost pattern electrode 201*a* may overlap the magnet part 1310, and another region of the first outermost pattern electrode 201*a* may not overlap the magnet part 1310.

In addition, the entire region of the first innermost pattern electrode 201*b* may be disposed to overlap the magnet portion 1310. Alternatively, one region of the first innermost pattern electrode 201*b* may overlap the magnet part 1310, and another region of the first innermost pattern electrode 201*b* may not overlap the magnet part 1310.

That is, the substrate region in which the first outermost pattern electrode 201*a* and the first innermost pattern electrode 201*b* are disposed may be defined as a critical region in which the pattern electrode and the magnet part 1310 may overlap.

That is, even if a pattern electrode is further disposed outside the first outermost pattern electrode 201*a* and inside the first innermost pattern electrode 201*b*, the further disposed pattern electrodes do not overlap the magnet part 1310. Accordingly, the length of the coil is increased, but there may be no electromotive force effect.

The first outermost pattern electrode 201*a*, the first innermost pattern electrode 201*b*, and the first center pattern electrode 201*c* may be disposed to be spaced apart from each other.

In detail, the first outermost pattern electrode 201*a* and the first center pattern electrode 201*c* may be disposed to be spaced apart by a first interval d1, and the first innermost pattern electrode 201*b* and the first center pattern electrode 201*c* may be disposed to be spaced apart from each other by a second interval d2, and the first center pattern electrodes 201*c* may be disposed to be spaced apart from each other by a third interval d3.

The first interval d1, the second interval d2, and the third interval d3 may have the same or similar size.

For example, the first interval d1, the second interval d2, and the third interval d3 may be intervals S1, S2 of 5 μm to 15 μm. In detail, the first interval d1, the second interval d2, and the third interval d3 may have an interval of 7 μm to 13 μm. In more detail, the first interval d1, the second interval d2, and the third interval d3 may have an interval of 9 μm to 11 μm.

When the first interval d1, the second interval d2, and the third interval d3 are formed to be less than 5 μm, when the first coil electrode 210 is formed, the photosensitive pattern may collapse due to a reduction in the line width of the photosensitive pattern. Accordingly, as the pattern electrodes of the coil electrodes are shorted to each other, the line widths of the respective pattern electrodes of each coil electrode may become non-uniform. In addition, when the first interval d1, the second interval d2, and the third interval d3 are formed to exceed 15 μm, the length of the first coil electrode 210 may be increased overall.

The first outermost pattern electrode 201*a*, the first innermost pattern electrode 201*b*, and the first center pattern electrode 201*c* may have different line widths. In detail, a line width w1 of the first outermost pattern electrode 201*a* and a line width w2 of the first innermost pattern electrode 201*b* may be greater than a line width w3 of the first center pattern electrode 201*c*. That is, the line widths of the outermost pattern electrode and the innermost pattern electrode among the pattern electrodes of the first coil electrode 210 may be greater than the line width of the center pattern electrode between the outermost pattern electrode and the innermost pattern electrode.

That is, the line widths of the outermost pattern electrode and the innermost pattern electrode disposed in the critical region overlapping the magnet portion may be formed to be greater than the line width of the center pattern electrode.

Accordingly, the line width of the pattern electrode of the first coil electrode may be increased, and resistance of the first coil electrode may be decreased by increasing the line width of the pattern electrode.

For example, the line width w1 of the first outermost pattern electrode 201*a* and the line width w2 of the first innermost pattern electrode 201b may be greater than 1 time and less than or equal to 10 times the line width w3 of the first center pattern electrode 201c.

The line width w1 of the first outermost pattern electrode 201a and the line width w2 of the first innermost pattern electrode 201b are equal to or less than 1 times the size of the line width w3 of the first center pattern electrode 201c, the effect of reducing resistance due to the line width w1 of the first outermost pattern electrode 201a and the line width w2 of the first innermost pattern electrode 201b cannot be realized.

The line width w1 of the first outermost pattern electrode 201a and the line width w2 of the first innermost pattern electrode 201b are exceed 10 times the size of the line width w3 of the first center pattern electrode 201c, the effect of reducing resistance due to the line width w1 of the first outermost pattern electrode 201a and the line width w2 of the first innermost pattern electrode 201b is small, and the size of the coil member may be increased.

For example, the line width w3 of the first central pattern electrode 201c may be about 22 μm to about 32 μm. In addition, the line width w1 of the first outermost pattern electrode 201a and the line width w2 of the first innermost pattern electrode 201b may be about 30 μm to 330 μm.

The line width w1 of the first outermost pattern electrode 201a and the line width w2 of the first innermost pattern electrode 201b may be greater than the line width w3 of the first central pattern electrode 201c within the line width range. In addition, the line width w1 of the first outermost pattern electrode 201a and the line width w2 of the first innermost pattern electrode 201b may be formed to have the same or different line widths within the line width range.

Meanwhile, referring to FIGS. 9 to 11, the pattern electrode of the second coil electrode 220 may be formed similarly to the pattern electrode of the first coil electrode 210.

In detail, referring to FIGS. 9 to 11, the second coil electrode 220 may include a plurality of second pattern electrodes spaced apart from each other. The pattern electrodes of the second coil electrode 220 may be divided according to respective positions of the pattern electrodes. For example, when a region close to the second region 2A is defined inside and a region close to the coupling hole h is defined outside, the second coil electrode 210 may include a second outermost pattern 202a, a second innermost patterned electrode 202b, and a second t center patterned electrode 202c. The dummy electrodes 500 may be disposed between the second innermost pattern electrodes 202b facing each other. Also, the dummy electrodes 500 may be disposed outside the second outermost pattern 202a.

In detail, the second outermost pattern electrode 202a may be defined as an outermost pattern electrode of the pattern electrode, and the second innermost pattern electrode 202b may be defined as an innermost pattern electrode of the pattern electrode.

The second outermost pattern electrode 202a, the second innermost pattern electrode 202b, and the second center pattern electrode 202c may be defined as regions overlapping the magnet part 1310. In detail, the second outermost pattern electrode 202a, the second innermost pattern electrode 202b, and the second center pattern electrode 202c of the second coil electrode 220 may vertically overlap the magnet part 1310 disposed on the coil member.

In detail, the entire region of the second outermost pattern electrode 202a may be disposed to overlap the magnet portion 1310. Alternatively, one region of the second outermost pattern electrode 202a may overlap the magnet part 1310, and another region of the second outermost pattern electrode 202a may not overlap the magnet part 1310.

In addition, the entire region of the second innermost pattern electrode 202b may be disposed to overlap the magnet portion 1310. Alternatively, one region of the second innermost pattern electrode 202b may overlap the magnet part 1310, and another region of the second innermost pattern electrode 202b may not overlap the magnet part 1310.

That is, the substrate region in which the second outermost pattern electrode 202a and the second innermost pattern electrode 202b are disposed may be defined as a critical region in which the pattern electrode and the magnet part 1310 may overlap.

That is, even if a pattern electrode is further disposed outside the second outermost pattern electrode 202a and inside the second innermost pattern electrode 202b, the further disposed pattern electrodes do not overlap the magnet part 1310. Accordingly, the length of the coil is increased, but there may be no electromotive force effect.

The second outermost pattern electrode 202a, the second innermost pattern electrode 202b, and the second center pattern electrode 202c may be disposed to be spaced apart from each other.

In detail, the second outermost pattern electrode 202a and the second center pattern electrode 202c may be disposed to be spaced apart by a first' interval d1', and the second innermost pattern electrode 202b and the second center pattern electrode 202c may be disposed to be spaced apart from each other by a second' interval d2', and the second center pattern electrodes 202c may be disposed to be spaced apart from each other by a third' interval d3'.

The first' interval d1', the second' interval d2', and the third' interval d3' may have the same or similar size.

For example, the first' interval d1', the second' interval d2', and the third' interval d3' may be intervals S1, S2 of 5 μm to 15 μm. In detail, the first' interval d1', the second' interval d2', and the third' interval d3' may have a interval of 7 μm to 13 μm. In more detail, the first' interval d1', the second' interval d2', and the third' interval d3' may have an interval of 9 μm to 11 μm.

When the first' interval d1', the second' interval d2', and the third' interval d3' are formed to be less than 5 μm, when the second coil electrode 220 is formed, the photosensitive pattern may collapse due to a reduction in the line width of the photosensitive pattern. Accordingly, as the pattern electrodes of the coil electrodes are shorted to each other, the line widths of the respective pattern electrodes of each coil electrode may become non-uniform. In addition, when the first' interval d1', the second' interval d2', and the third' interval d3' are formed to exceed 15 μm, the length of the second coil electrode 220 may be increased overall.

Meanwhile, the first interval d1, the second interval d2, and the third interval d3 described above are the first' interval d1', the second' interval d2', and the third interval d3' and may be the same as or different from each other within the above range.

The second outermost pattern electrode 202a, the second innermost pattern electrode 202b, and the second center pattern electrode 202c may have different line widths. In detail, a line width w1' of the second outermost pattern electrode 202a and a line width w2' of the second innermost pattern electrode 202b may be greater than a line width w3' of the second center pattern electrode 202c. That is, the line widths of the outermost pattern electrode and the innermost pattern electrode among the pattern electrodes of the second coil electrode 220 may be greater than the line width of the center pattern electrode between the outermost pattern electrode and the innermost pattern electrode.

That is, the line widths of the outermost pattern electrode and the innermost pattern electrode disposed in the critical region overlapping the magnet portion may be formed to be greater than the line width of the center pattern electrode.

Accordingly, the line width of the pattern electrode of the second coil electrode may be increased, and resistance of the second coil electrode may be decreased by increasing the line width of the pattern electrode.

For example, the line width w1' of the second outermost pattern electrode 202a and the line width w2' of the second innermost pattern electrode 202b may be greater than 1 time and less than or equal to 10 times the line width w3' of the second center pattern electrode 202c.

The line width w1' of the second outermost pattern electrode 202a and the line width w2' of the second innermost pattern electrode 202b are equal to or less than 1 times the size of the line width w3' of the second center pattern electrode 202c, the effect of reducing resistance due to the line width w1' of the second outermost pattern electrode 202a and the line width w2' of the second innermost pattern electrode 202b cannot be realized.

The line width w1' of the second outermost pattern electrode 202a and the line width w2' of the second innermost pattern electrode 202b are exceed 10 times the size of the line width w3' of the second center pattern electrode 202c, the effect of reducing resistance due to the line width w1' of the second outermost pattern electrode 202a and the line width w2' of the second innermost pattern electrode 202b is small, and the size of the coil member may be increased.

For example, the line width w3' of the second central pattern electrode 202c may be about 22 μm to about 32 μm. In addition, the line width w1' of the second outermost pattern electrode 202a and the line width w2' of the second innermost pattern electrode 202b may be about 30 μm to 330 μm.

The line width w1' of the second outermost pattern electrode 202a and the line width w2' of the second innermost pattern electrode 202b may be greater than the line width w3' of the second central pattern electrode 202c within the line width range. In addition, the line width w1' of the second outermost pattern electrode 202a and the line width w2' of the second innermost pattern electrode 202b may be formed to have the same or different line widths within the line width range.

In addition, the line width w1 of the first outermost pattern electrode 201a and the line width w1' of the second outermost pattern electrode 202a may be the same as or different from each other within the above range. And, the line width w2 of the first innermost pattern electrode 201b and the line width w2' of the second innermost pattern electrode 202b may be the same as or different from each other within the above range.

Referring to FIG. 12, on both surfaces of the substrate 100, the first outermost pattern electrode 201a and the second outermost pattern electrode 202a are disposed at corresponding positions, and the first innermost pattern electrode 201b and the second innermost pattern electrode 202b are disposed at corresponding positions, and first center pattern electrode 201c and the second center pattern electrode 202c are disposed at corresponding positions. In addition, the line width of the first outermost pattern electrode 201a and the line width of the first innermost pattern electrode 201b are greater than the line width of the first center pattern electrode 201c, and the line width of the second outermost pattern electrode 202a and the line width of the second innermost pattern electrode 202b are greater than the line width of the second center pattern electrode 202c.

In the coil member according to the embodiment, the line width of the pattern electrodes disposed at the outermost and/or innermost side among the pattern electrodes of the coil electrode may be different from the line width of the central pattern electrode.

In detail, the line width of the outermost and/or innermost pattern electrodes among the pattern electrodes of the coil electrode may be formed to be greater than the line width of the central pattern electrode.

Accordingly, by increasing the line width of the coil electrode, which is one variable of the resistance of the coil electrode, it is possible to reduce the resistance of the coil electrode.

Accordingly, by reducing the resistance of the coil electrode, it is possible to improve the characteristics of the coil member and the camera module including the same.

Also, in the coil member according to the embodiment, a plurality of unit coil electrodes may be connected through a plurality of via holes.

Accordingly, the length and the disposal area of the connecting electrodes connecting the unit coil electrodes can be reduced. Accordingly, it is possible to prevent an increase in resistance due to an increase in the length of the connection electrode, and it is possible to reduce the size of the coil member by minimizing the disposal area.

Hereinafter, a coil member according to another embodiment will be described with reference to FIGS. 13 to 20.

In the coil member according to another embodiment, the reliability of the coil member may be improved by differently controlling the spacing between the pattern electrodes of the first coil electrode and the second coil electrode for each region.

Referring to FIG. 13, the first coil electrode 210 may be extend in one direction while having a plurality of bent regions.

Accordingly, the first coil electrode 210 may be formed in a coil pattern shape as a whole. For example, the first pattern electrode 201 of the first coil electrode 210 may be formed as a coil-shaped electrode while being extend in one direction from the outside to the inside or from the inside to the outside.

The first coil electrode 210 may include a first region 1A, a second region 2A, and a third region 3A defined according to the direction of the first pattern electrode. In detail, the first coil electrode may include a first region 1A in which the first pattern electrode 201 extends in a first direction, a second region 2A in which the first pattern electrode 201 extends in a direction different from the first direction, and a third region 3A in which the direction of the first pattern electrode 201 is changed between the first region 1A and the second region 2A in the first pattern electrode 201.

In detail, the first region 1A and the second region 2A may be regions in which the first pattern electrode 201 extends in a straight line, that is, in one direction, and the third region 3A may be a region in which the direction of the pattern electrode is changed from one direction to another.

That is, the third region 3A may be a region in which the first coil electrode 210 is bent.

The number of the third regions 3A may vary according to the direction of the first region 1A and the second region 2A. For example, referring to FIG. 6, the first coil electrode 210 may be extend in one direction while having four third regions 3A.

Referring to FIGS. 14 to 16, the spacing between the first pattern electrodes of the first coil electrode 210 may be different for each region. In detail, interval between the first pattern electrodes of the first coil electrode 210 may be different from each other in the first region 1A, the second region 2A, and the third region 3A.

For example, in the first coil electrode 210, the first pattern electrodes 201 are spaced apart by a first interval d1 in the first region 1A and the second region 2A, and the first pattern electrodes 201 are spaced apart by a second interval d2 in the third region 3A.

In this case, the first interval d1 and the second interval d2 may be defined as a distance between adjacent first pattern electrodes.

In this case, the sizes of the first interval d1 and the second interval d2 may be different from each other. In detail, the size of the second interval d2 may be greater than the size of the first interval d1. That is, in the bent region of the first coil electrode in which the direction of the pattern electrode 201 is changed, the interval between the first pattern electrodes 201 may be greater than that of other regions.

Meanwhile, in the first coil electrode 210, in all of the plurality of third regions, the interval between the first pattern electrodes 201 may be greater than in other regions. Alternatively, in only portion of the plurality of third regions, the interval between the first pattern electrodes 201 may be greater than in other regions.

For example, when the first coil electrode 210 includes two pairs of third regions facing each other, an interval between the first pattern electrodes 201 in any pair of third regions facing each other may be greater than that in other regions. Alternatively, the interval between the first pattern electrodes 201 in both pairs of the third regions facing each other may be greater than that of the other regions.

The first interval d1 and the second interval d2 may be the same as a width of a photosensitive pattern disposed between the first pattern electrodes 201 to form the first coil electrode 210. In this case, in the region where the pattern electrodes 201 are bent, the width of the photosensitive pattern is formed to be larger than that of other regions, so that the collapse of the photosensitive pattern in the bent region can be minimized.

Accordingly, it is possible to prevent the photosensitive pattern from collapsing in the bent region, shorting the pattern electrodes to each other, or the shape of the pattern electrode becoming non-uniform.

For example, the size of the first interval d1 may be 5 μm to 15 μm. When the first interval d1 is formed to be less than 5 μm, when the first coil electrode 210 is formed, the photosensitive pattern may collapse due to a reduction in the line width of the photosensitive pattern. Accordingly, as the pattern electrodes of the coil electrodes are shorted to each other, the line widths of the respective pattern electrodes of each coil electrode may become non-uniform. In addition, when the first interval d1 is formed to exceed 15 μm, the length of the first coil electrode 210 may be increased overall.

In addition, the size of the second interval d2 may be 30 μm to 70 μm When the second interval d2 is formed to be less than 5 μm, the photosensitive pattern may collapse at the bent area of the first coil electrode. Accordingly, as the pattern electrodes of the coil electrodes are shorted to each other, the line widths of the respective pattern electrodes of each coil electrode may become non-uniform. In addition, when the first interval d1 is formed to exceed 70 μm, the curvature in the bent region of the first coil electrode becomes too large, so that the overall area of the first coil electrode 210 may be increased.

In addition, the line widths of the first pattern electrode 201 in the first region 1A, the second region 2A, and the third region 3A may be different.

For example, the line width of the first pattern electrode 201 in the third region 3A may be smaller than line width of the first pattern electrode 201 at least one of the first region 1A and the second region 2A.

Meanwhile, referring to FIGS. 17 to 20, the pattern electrode of the second coil electrode 220 may be formed similarly to the pattern electrode of the first coil electrode 210.

Referring to FIG. 17, the second coil electrode 220 may be extend in one direction while having a plurality of bent regions.

Accordingly, the second coil electrode 220 may be formed in a coil pattern shape as a whole. For example, the second pattern electrode 202 of the second coil electrode 220 may be formed as a coil-shaped electrode while being extend in one direction from the outside to the inside or from the inside to the outside.

The second coil electrode 220 may include a first' region 1'A, a second' region 2'A, and a third' region 3'A defined according to the direction of the second pattern electrode. In detail, the second coil electrode may include the first' region 1'A in which the second pattern electrode 202 extends in a first direction, the second' region 2'A in which the second pattern electrode 202 extends in a direction different from the first direction, and the third' region 3'A in which the direction of the second pattern electrode 202 is changed between the first' region 1'A and the second' region 2'A in the second pattern electrode 202.

In detail, the first' region 1'A and the second' region 2'A may be regions in which the second pattern electrode 202 extends in a straight line, that is, in one direction, and the third' region 3'A may be a region in which the direction of the pattern electrode is changed from one direction to another.

That is, the third' region 3'A may be a region in which the second coil electrode 220 is bent.

The positions of the first area 1A and the first' area 1'A may correspond to each other. And, the positions of the second area 2A and the second' area TA may correspond to each other. That is, the positions of the first region 1A and the first' region 1'A may overlap each other in the thickness direction of the substrate. And, the positions of the second region 2A and the second' region 2'A may overlap each other in the thickness direction of the substrate Also, the positions of the third area 3A and the third' area 3'A may correspond to each other. That is, the positions of the third area 3A and the third' area 3'A may overlap each other in the thickness direction of the substrate.

The number of the third' regions 3'A may vary according to the direction of the first' region 1'A and the second' region 2'A. For example, referring to FIG. 17, the second coil electrode 220 may be extend in one direction while having four third' regions 3'A.

Referring to FIGS. 18 to 20, the spacing between the second pattern electrodes of the second coil electrode 210 may be different for each region. In detail, interval between the second pattern electrodes of the second coil electrode 220 may be different from each other in the first' region 1'A, the second' region 2'A, and the third' region 3'A.

For example, in the second coil electrode 220, the second pattern electrodes 202 are spaced apart by a first' interval d1' in the first' region 1'A and the second' region 2'A, and the second pattern electrodes 202 are spaced apart by a second' interval d2' in the third region 3'A.

In this case, the first' interval d1' and the second' interval d2' may be defined as a distance between adjacent second pattern electrodes.

In this case, the sizes of the first' interval d1' and the second' interval d2' may be different from each other. In detail, the size of the second' interval d2' may be greater than the size of the first' interval d1'. That is, in the bent region of the second coil electrode in which the direction of the second pattern electrode 202 is changed, the interval between the second pattern electrodes 202 may be greater than that of other regions.

For example, when the second coil electrode 220 includes two pairs of third' regions facing each other, an interval between the second pattern electrodes 202 in any pair of third' regions facing each other may be greater than that in other regions. Alternatively, the interval between the second pattern electrodes 202 in both pairs of the third' regions facing each other may be greater than that of the other regions.

The first' interval d1' and the second' interval d2' may be the same as a width of a photosensitive pattern disposed between the second pattern electrodes 202 to form the second coil electrode 220. In this case, in the region where the second pattern electrodes 202 are bent, the width of the photosensitive pattern is formed to be larger than that of other regions, so that the collapse of the photosensitive pattern in the bent region can be minimized.

Accordingly, it is possible to prevent the photosensitive pattern from collapsing in the bent region, shorting the pattern electrodes to each other, or the shape of the pattern electrode becoming non-uniform.

For example, the size of the first' interval d1' may be 5 μm to 15 μm. When the first' interval d1' is formed to be less than 5 μm, when the second coil electrode 220 is formed, the photosensitive pattern may collapse due to a reduction in the line width of the photosensitive pattern. Accordingly, as the pattern electrodes of the coil electrodes are shorted to each other, the line widths of the respective pattern electrodes of each coil electrode may become non-uniform. In addition, when the first' interval d1' is formed to exceed 15 μm, the length of the second coil electrode 220 may be increased overall.

In addition, the size of the second' interval d2' may be 30 μm to 70 μm When the second' interval d2' is formed to be less than 5 μm, the photosensitive pattern may collapse at the bent area of the first coil electrode. Accordingly, as the pattern electrodes of the coil electrodes are shorted to each other, the line widths of the respective pattern electrodes of each coil electrode may become non-uniform. In addition, when the first' interval d1' is formed to exceed 70 μm, the curvature in the bent region of the second coil electrode becomes too large, so that the overall area of the second coil electrode 220 may be increased.

In addition, the line widths of the second pattern electrode 202 in the first' region 1'A, the second' region 2'A, and the third' region 3'A may be different.

For example, the line width of the second pattern electrode 202 in the third' region 3'A may be smaller than line width of the second pattern electrode 202 at least one of the first' region 1'A and the second' region 2'A.

In the coil member according to another embodiment, the spacing between the pattern electrodes of the coil electrode may be different for each region.

In detail, in the coil member, the interval between the pattern electrodes in the bent region of the coil electrode may be larger than that of the other regions.

Accordingly, when forming the coil electrode, it is possible to increase the line width of the photosensitive pattern, thereby preventing the photosensitive pattern from being weakly supported in the bent region from collapsing.

That is, by forming the photosensitive pattern disposed with a fine line width to be larger in the bending region than in other regions, the photosensitive pattern can be stably formed in the bending region as well.

Accordingly, the coil member according to another embodiment may prevent short circuits and pattern shape non-uniformity of the coil electrode in the bending region, and accordingly, the coil member according to another embodiment may have improved reliability.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A coil member comprising:
   a substrate comprising an upper surface and a lower surface opposite to the upper surface;
   a first coil electrode disposed on the upper surface of the substrate and including a first pattern electrode; and
   a second coil electrode disposed on the lower surface of the substrate and including a second pattern electrode,
   wherein the first coil electrode includes a first outermost pattern electrode, a first innermost pattern electrode, and a first center pattern electrode between the first outermost pattern electrode and the first innermost pattern electrode pattern,
   wherein at least one of a line width of the first outermost pattern electrode and a line width of the first innermost pattern electrode is greater than a line width of the first central pattern electrode.

2. The coil member of claim 1, wherein the line width of the first outermost pattern electrode and the line width of the first innermost pattern electrode are greater than 1 to 10 times the line width of the first central pattern electrode.

3. The coil member of claim 2, wherein the line width of the first central pattern electrode is 22 μm to 32 μm,
   wherein the line width of the first outermost pattern electrode and the line width of the first innermost pattern electrode are 30 μm to 330 μm.

4. The coil member of claim 1, wherein the second coil electrode includes a second outermost pattern electrode, a second innermost pattern electrode, and a second center pattern electrode between the second outermost pattern electrode and the second innermost pattern electrode pattern, wherein at least one of the line width of the second outermost pattern electrode and the line width of the second innermost pattern electrode is greater than the line width of the second center pattern electrode.

5. The coil member of claim 4, wherein the line width of the second outermost pattern electrode and the line width of the second innermost pattern electrode are greater than 1 to 10 times greater than the line width of the second central pattern electrode,
wherein the line width of the first outermost pattern electrode and the line width of the first innermost pattern electrode are the same as or different from the line width of the second outermost pattern electrode and the line width of the second innermost pattern electrode.

6. The coil member of claim 5, wherein the line width of the second central pattern electrode is 22 µm to 32 µm,
wherein the line width of the second outermost pattern electrode and the line width of the second innermost pattern electrode are 30 µm to 330 µm.

7. The coil member of claim 6, wherein the first coil electrode includes a 1-1 coil electrode, a 1-2 coil electrode, a 1-3 coil electrode, and a 1-4 coil electrode,
wherein the second coil electrode includes a 2-1 coil electrode, a 2-2 coil electrode, a 2-3 coil electrode, and a 2-4 coil electrode,
wherein the 2-1 coil electrode is connected to the 1-1 coil electrode through a first via hole inside the 2-1 coil electrode;
wherein the 1-1 coil electrode is connected to the 1-4 coil electrode through a connection electrode,
wherein the 1-4 coil electrode is connected to the 2-4 coil electrode through a second via hole inside the 1-4 coil electrode.

8. The coil member of claim 7, wherein the 2-2 coil electrode is connected to the 1-2 coil electrode through a third via hole inside the 2-2 coil electrode;
wherein the 1-2 coil electrodes are connected to the 1-3 coil electrodes through a fourth via hole, a fifth via hole, and the connection electrode,
wherein the 1-3 coil electrode is connected to the 2-3 coil electrode through a sixth via hole inside the 1-3 coil electrode,
wherein the fourth via hole and the fifth via hole are formed outside the first coil electrode and the second coil electrode.

9. The coil member of claim 5, further comprising a dummy electrode disposed between the first innermost pattern electrodes facing each other, an outer side of the first outermost pattern, between the second innermost pattern electrodes facing each other, and an outer side of the second outermost pattern.

10. The coil member of claim 1, wherein a plurality of via holes are formed in the substrate,
wherein at least one via hole is disposed inside the first coil electrode and the second coil electrode,
wherein at least one via hole is disposed outside the first coil electrode and the second coil electrode.

11. The coil member of claim 1, wherein the first coil electrode includes a 1-1 coil electrode, a 1-2 coil electrode, a 1-3 coil electrode, and a 1-4 coil electrode spaced apart from each other,
wherein the second coil electrode includes a 2-1 coil electrode, a 2-2 coil electrode, a 2-3 coil electrode, and a 2-4 coil electrode spaced apart from each other,
wherein the 1-1 coil electrode and the 2-1 coil electrode, the 1-2 coil electrode and the 2-2 coil electrode, the 1-3 coil electrode and the 2-3 coil electrode, and the 1-4 coil electrodes and the 2-4 coil electrodes are disposed at positions overlapping each other in the thickness direction of the substrate.

12. The coil member of claim 1, wherein the first coil electrode includes a plurality of first pattern electrodes spaced apart from each other,
wherein the second coil electrode includes a plurality of second pattern electrodes spaced apart from each other,
wherein the first coil electrode includes a first region in which the first pattern electrode extends in a first direction, a second region extending in a direction different from the first direction, and a third region in which the direction of the pattern electrode is changed between the first region and the second region,
wherein a second interval between the first pattern electrodes in the third region is greater than a first interval between the first pattern electrodes in the first region and the second region.

13. The coil member of claim 12, wherein the second interval is 30 µm to 70 µm.

14. The coil member of claim 12, wherein the second coil electrode includes a first' region in which the second pattern electrode extends in a first' direction, a second' region extending in a direction different from the first' direction; and a third' region in which the direction of the pattern electrode is changed between the first' region and the second' region,
wherein a second' interval between the second pattern electrodes in the third' region is greater than a first' interval between the second pattern electrodes in the first' region and the second' region.

15. The coil member of claim 14, wherein the first region, the first' region, the second region, and the second' region overlap each other in a thickness direction of the substrate,
wherein the third region and the third' region overlap each other in the thickness direction of the substrate.

16. The coil member of claim 14, wherein the second' interval is 30 µm to 70 µm.

17. The coil member of claim 14, wherein the third region includes a plurality of third regions,
wherein the third' region includes a plurality of third' regions,
wherein in at least one third region of the plurality of third regions, a second interval of the first pattern electrode is greater than a first interval of the first pattern electrode in the first region and the second region,
wherein in at least one third' region of the plurality of third' regions, a second' interval of the second pattern electrode is greater than a first' interval of the second pattern electrode in the first' region and the second' region.

18. The coil member of claim 12, wherein a plurality of via holes are formed in the substrate,
wherein at least one via hole is formed inside the first coil electrode and the second coil electrode,
wherein at least one via hole is disposed outside the first coil electrode and the second coil electrode.

19. The coil member of claim 12, wherein the first coil electrode includes a 1-1 coil electrode, a 1-2 coil electrode, a 1-3 coil electrode, and a 1-4 coil electrode spaced apart from each other,
wherein the second coil electrode includes a 2-1 coil electrode, a 2-2 coil electrode, a 2-3 coil electrode, and a 2-4 coil electrode spaced apart from each other,
wherein the 1-1 coil electrode and the 2-1 coil electrode, the 1-2 coil electrode and the 2-2 coil electrode, the 1-3 coil electrode and the 2-3 coil electrode, and the 1-4 coil electrode and the 2-4 coil electrode are disposed at positions overlapping each other in a thickness direction of the substrate.

20. A camera module comprising:
a first mover disposed on a side surface of a lens unit to move the lens unit;
a second mover positioned so as to face the first mover on a side surface of the first mover;
a stator positioned so as to face a lower side of the second mover to move the second mover and having a through-hole corresponding to the lens unit formed in a center thereof; and
a base supporting the stator and the second mover and having a hollow hole corresponding to a through-hole of the second mover formed in a center thereof,
wherein the stator includes a circuit board and a coil member disposed on the circuit board,
wherein the coil member includes:
a substrate comprising an upper surface and a lower surface opposite to the upper surface;
a first coil electrode disposed on the upper surface of the substrate and including a first pattern electrode; and
a second coil electrode disposed on the lower surface of the substrate and including a second pattern electrode,
wherein the first coil electrode includes a first outermost pattern electrode, a first innermost pattern electrode, and a first center pattern electrode between the first outermost pattern electrode and the first innermost pattern electrode pattern,
wherein at least one of a line width of the first outermost pattern electrode and a line width of the first innermost pattern electrode is greater than a line width of the first central pattern electrode.

* * * * *